(12) United States Patent
Ebata

(10) Patent No.: US 7,752,290 B2
(45) Date of Patent: Jul. 6, 2010

(54) INFORMATION PROCESSING APPARATUS CONNECTABLE TO PERIPHERAL DEVICE, CONTROLLING METHOD, AND COMPUTER-READABLE STORAGE MEDIUM STORING CONTROL PROGRAM THEREON

(75) Inventor: Masamichi Ebata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 10/642,731

(22) Filed: Aug. 19, 2003

(65) Prior Publication Data

US 2004/0093491 A1 May 13, 2004

(30) Foreign Application Priority Data

Aug. 21, 2002  (JP) .............................. 2002-240555
Aug. 21, 2002  (JP) .............................. 2002-240556

(51) Int. Cl.
*G06F 15/177* (2006.01)
*G06F 3/12* (2006.01)

(52) U.S. Cl. ..................................... 709/222; 358/1.13
(58) Field of Classification Search ................. 709/222; 358/1.15, 1.13
See application file for complete search history.

(56) References Cited

U.S. PATENT DOCUMENTS

| 5,580,177 A | * | 12/1996 | Gase et al. | ..................... 400/61 |
| 6,607,314 B1 | * | 8/2003 | McCannon et al. | ........... 400/62 |
| 7,168,003 B2 | * | 1/2007 | Lozano et al. | ................. 714/25 |
| 7,401,113 B1 | * | 7/2008 | Appiah et al. | ................ 709/203 |
| 2003/0115302 A1 | * | 6/2003 | Teraoaka et al. | ............ 709/221 |
| 2004/0030809 A1 | * | 2/2004 | Lozano et al. | ................. 710/8 |
| 2005/0141008 A1 | * | 6/2005 | Billow et al. | ............... 358/1.13 |

FOREIGN PATENT DOCUMENTS

| JP | 10-094051 A1 | 4/1998 |
| JP | 10-301884 A1 | 11/1998 |
| JP | 11-53289 | 2/1999 |
| JP | 11-53289 A1 | 2/1999 |
| JP | 11-224999 A1 | 8/1999 |
| JP | 2000-353079 A1 | 12/2000 |
| JP | 2001-43177 A1 | 2/2001 |
| JP | 2001-251525 A1 | 9/2001 |
| JP | 2002-229751 A1 | 8/2002 |
| JP | 2003-84984 | 3/2003 |

* cited by examiner

*Primary Examiner*—Nathan Flynn
*Assistant Examiner*—Chirag R Patel
(74) *Attorney, Agent, or Firm*—Fitzpatrick, Cella, Harper & Scinto

(57) ABSTRACT

A method having the following steps for managing device drivers in an information processing apparatus connectable to peripheral devices is disclosed. The method comprises obtaining version information for device drivers in the information processing apparatus and information on peripheral devices that can be controlled by the device drivers, a recognizing unnecessary device drivers among possibly multiple versions of device drivers that reside in the storage device of the information processing apparatus and correspond to a particular peripheral device, based on the obtained version information and peripheral devices information, and controlling deletion of device drivers that have been recognized as unnecessary.

12 Claims, 25 Drawing Sheets

FIG. 4

| PRINT CONTROLLING MODULE | VERSION NUMBER | SUPPORTED PRINTER |
|---|---|---|
| PRINT CONTROLLING MODULE 1 | 1.0.0 | PRINTER A<br>PRINTER B<br>PRINTER C |
| PRINT CONTROLLING MODULE 2 | 2.0.0 | PRINTER A<br>PRINTER B<br>PRINTER D |
| PRINT CONTROLLING MODULE 3 | 3.0.0 | PRINTER A<br>PRINTER E |

FIG. 6

| PRINTER | VERSION INFORMATION | PRINT CONTROLLING MODULE IDENTIFICATION INFORMATION |
|---|---|---|
| PRINTER A | 3.0.0 | PRINT CONTROLLING MODULE 3 |
| PRINTER B | 2.0.0 | PRINT CONTROLLING MODULE 2 |
| PRINTER C | 1.0.0 | PRINT CONTROLLING MODULE 1 |
| PRINTER D | 2.0.0 | PRINT CONTROLLING MODULE 2 |
| PRINTER E | 3.0.0 | PRINT CONTROLLING MODULE 3 |

| PRINTER MODULE | VERSION NUMBER | SUPPORT INFORMATION ||
| --- | --- | --- | --- |
| | | SUPPORTED PRINTER | DATABASE FILE |
| PRINTER MODULE 1 | 1.0.0 | PRINTER A<br>PRINTER B<br>PRINTER C | DATABASE A<br>DATABASE B<br>DATABASE C |
| PRINTER MODULE 2 | 2.0.0 | PRINTER A<br>PRINTER B<br>PRINTER D | DATABASE A<br>DATABASE B<br>DATABASE D |
| PRINTER MODULE 3 | 3.0.0 | PRINTER A<br>PRINTER E | DATABASE A<br>DATABASE E |

FIG. 14

| PRINTER | VERSION NUMBER | CORRESPONDENCE TO VERSION MANAGEMENT MODULE | PRINTER DRIVER IDENTIFICATION INFORMATION |
|---|---|---|---|
| PRINTER A | 3.0.0 | ○ | PRINTER DRIVER 3 |
| PRINTER B | 2.0.0 | ○ | PRINTER DRIVER 2 |
| PRINTER C | 1.0.0 | ○ | PRINTER DRIVER 1 |
| PRINTER D | 2.0.0 | ○ | PRINTER DRIVER 2 |
| PRINTER E | 3.0.0 | ○ | PRINTER DRIVER 3 |

FIG. 15

| PRINTER | VERSION NUMBER | CORRESPONDENCE TO VERSION MANAGEMENT MODULE | PRINTER DRIVER IDENTIFICATION INFORMATION |
|---|---|---|---|
| PRINTER A | 0.5.0 | × | PRINTER DRIVER 4 |
| PRINTER B | 2.0.0 | ○ | PRINTER DRIVER 2 |
| PRINTER C | 1.0.0 | ○ | PRINTER DRIVER 1 |
| PRINTER D | 2.0.0 | ○ | PRINTER DRIVER 2 |
| PRINTER E | 3.0.0 | ○ | PRINTER DRIVER 3 |

FIG. 16

| PRINTER DRIVER | VERSION NUMBER | SUPPORTED PRINTER |
|---|---|---|
| PRINTER DRIVER 1 | 1.0.0 | PRINTER C |
| PRINTER DRIVER 2 | 2.0.0 | PRINTER B<br>PRINTER D |
| PRINTER DRIVER 3 | 3.0.0 | PRINTER A<br>PRINTER E |

FIG. 17

| PRINTER DRIVER | VERSION NUMBER | SUPPORTED PRINTER |
|---|---|---|
| PRINTER DRIVER 1 | 1.0.0 | PRINTER C |
| PRINTER DRIVER 2 | 2.0.0 | PRINTER B<br>PRINTER D |
| PRINTER DRIVER 3 | 3.0.0 | PRINTER E |

FIG. 22

| PRINTER DRIVER | VERSION NUMBER | SUPPORT INFORMATION | |
|---|---|---|---|
| | | NUMBER OF SUPPORTED MODELS | SUPPORTED PRINTER |
| PRINTER DRIVER 3 | 2.0.0 | 3 | PRINTER A<br>PRINTER B<br>PRINTER C |
| PRINTER DRIVER 4 | 3.0.0 | 4 | PRINTER A<br>PRINTER B<br>PRINTER C<br>PRINTER D |

FIG. 26

| PRINTER | VERSION INFORMATION | PRINTER DRIVER IDENTIFICATION INFORMATION |
|---|---|---|
| PRINTER A | 2.0.0 | PRINTER DRIVER 3 |
| PRINTER B | 2.0.0 | PRINTER DRIVER 3 |
| PRINTER C | 2.0.0 | PRINTER DRIVER 3 |
| PRINTER D | 1.1.0 | PRINTER DRIVER 2 |

FIG. 27

| PRINTER | VERSION INFORMATION | PRINTER DRIVER IDENTIFICATION INFORMATION |
|---|---|---|
| PRINTER A | 3.0.0 | PRINTER DRIVER 4 |
| PRINTER B | 3.0.0 | PRINTER DRIVER 4 |
| PRINTER C | 3.0.0 | PRINTER DRIVER 4 |
| PRINTER D | 3.0.0 | PRINTER DRIVER 4 |

FIG. 28

| PRINTER DRIVER IDENTIFICATION INFORMATION | VERSION NUMBER | NUMBER OF PRINTER MODELS | PRINTER |
|---|---|---|---|
| PRINTER DRIVER 1 | 1.0.0 | 0 | NONE |
| PRINTER DRIVER 2 | 1.1.0 | 1 | PRINTER D |
| PRINTER DRIVER 3 | 2.0.0 | 3 | PRINTER A<br>PRINTER B<br>PRINTER C |

FIG. 29

| PRINTER DRIVER IDENTIFICATION INFORMATION | VERSION NUMBER | NUMBER OF PRINTER MODELS | PRINTER |
|---|---|---|---|
| PRINTER DRIVER 2 | 1.1.0 | 0 | NONE |
| PRINTER DRIVER 3 | 2.0.0 | 0 | NONE |
| PRINTER DRIVER 4 | 3.0.0 | 4 | PRINTER A<br>PRINTER B<br>PRINTER C<br>PRINTER D |

INFORMATION PROCESSING APPARATUS CONNECTABLE TO PERIPHERAL DEVICE, CONTROLLING METHOD, AND COMPUTER-READABLE STORAGE MEDIUM STORING CONTROL PROGRAM THEREON

BACKGROUND OF THE INVENTION

1. Field of the Invention

The invention relates to a peripheral device, an information processing apparatus that is connectable to the peripheral device, and a system that includes them.

2. Related Background Art

In general, when printing is performed in a printing system consisting of a host computer and a printer, which is an example of peripheral device, first some application is executed in the host computer to generate drawing data to be printed such as characters and figures. When printing processing is selected in a menu and the like, the application passes the generated drawing data to an operating system and requests printing processing from it. When it receives a request for printing from the application, the operating system executes a printer driver, which is an example of device drivers corresponding to a printer connected to the host computer, so that the drawing data passed from the application is translated to printing commands executable by the printer. The printer driver receives the drawing data from the operating system and translates it to printing commands in accordance with a procedure defined by the operating system. The printer driver then outputs the printing commands to the connected printer using the communication capability of the operating system.

Printer models differ from each other in paper size they support, the type of ink, method of recording to paper, paper types that can be conveyed, way of conveying paper, therefore differ in method of controlling printing, method of image processing and usable parameters for printer commands. Thus, a printer driver for translating drawing data from an application to control commands for a printer has to be designed and manufactured with sufficient consideration of function features of the printer model. Thus, difference in function features of printers need to be reflected in the control algorithm of printer drivers for them, and even if some printers support the same command system, executable modules for printer drivers are prepared and supplied separately for each of the printers due to difference in programs that execute the control algorithms.

Meanwhile, there is a programming scheme in which a database of function features of printers is prepared, and portions of processing that have to be addressed model by model are executed by a printer driver switching between internal algorithms based on information obtained by referring to the database. In such a case, one executable module for a printer driver can support multiple kinds of printers. In this way, it is also possible to supply one printer driver as a product for multiple kinds of printers that have different function features.

As mentioned above, a printer and a printer driver for controlling the printer thus having a correspondence, a printer driver suitable for a printer in use needs to be installed on the host computer. Installation and uninstallation of a printer driver is performed by a program called an installer.

When a printer driver is installed in a host computer in which another printer driver is already installed, only a file has to be overwritten and there would be no problem if the name of a file for printer driver is not changed. However, a case is possible where the file name of the printer driver must be changed such as when the specification of the printer driver has been changed as to whether it supports only one printer or multiple models of printer. When the file name of the printer driver should be changed, printer drivers that have been previously resided in the host computer need to be deleted.

For such a situation, the function of uninstalling (deleting) a driver can be provided as a function of an installer for a printer driver or can be provided as a dedicated uninstalling program, and a user need to manually perform a cumbersome uninstalling operation by using it.

However, a system may undergo a transition operation that requires a printer driver of a type that supports one model to be changed to one of a type that supports a number of models. In this case, when multiple models of printers are connected to the host computer and used, the user has to know correctly if the printers now connected are supported by a new printer driver capable of supporting multiple models and then selectively delete an existing printer driver for an unnecessary model with a manual operation. Alternatively, a troublesome operation such as deleting all the printer drivers once and then reinstalling some printer drivers may be involved.

Alternatively, a programming scheme is possible that a printer driver switches between internal algorithms based on information it acquired by referring to a database of printer functions in order to perform portions of processing that must be addressed on a model-by-model basis. In this case, one executable module of a printer driver can support multiple kinds of printers. In such a way, one printer driver may be provided as a product for multiple kinds of printers with different function features.

However, upgrading of a printer driver is often performed in order to add a print controlling function to the printer driver or to improve image processing by the printer driver. When a printer driver that can support many types of printer with different functions and features is provided as a product, even if the addition of a function or the improvement is a module relating only to specific models, i.e. a module having effect only on printers of particular models among supported printers, an error of the program for the modified portion could effect control function of other printers if the printer driver has a common executable module. Consequently, even in modifying only a portion that is dependent on a particular model, operation of functions need to be checked for all the printers supported by the printer driver including a printer other than one of a model that should be improved from a viewpoint of quality guarantee for all the products, which leads to a problem of considerable amount of man-hour.

In contrast to the case above, when a printer driver is prepared and supplied for each printer model, only a driver that is suitable for a relevant printer need to be prepared and its operation is checked when a function is added or improvement is made to the printer driver, with a little amount of time and effort required for upgrading a function of a particular model. However, because a printer driver is prepared and supplied for each printer model, there could be a problem that it requires a lot of time and effort when printer driver products for multiple models of printers are released. In addition, there could be such a problem that since an executable files for a printer driver exists for each printer although its program has some processing common to other such programs, more disk area can be occupied by printer drivers when multiple printers are used by one host computer. Also, in a case where an updating module is downloaded over the Internet, a printer driver needs to be downloaded for each printer model, thus taking an extended download time.

SUMMARY OF THE INVENTION

The invention has been made for solution of the challenges above, and an aspect of the invention is to provide an installer that can simplify installation of a printer driver by automatically recognizing and deleting a printer driver that is no longer required.

Another aspect of the invention is to provide a printing system using a printer driver that can generate a printer driver capable of controlling multiple models of printers, provide a printing system dependent on printer drivers that can be supplied efficiently, and can efficiently check the operation of a printer driver when modification such as addition or improvement of a function is made to the printer driver.

According to another aspect of the invention, a first aspect of the invention is an information processing apparatus that has multiple control programs for performing processing corresponding to printer functions, including a first obtaining unit configured to obtain, from a first print control module, version information on a version of the first print control module and printer type information on a printer type supported by the first print control module; a second obtaining unit configured to obtain, from a second print control module, version information on a version of the second print control module and printer type information on a printer type supported by the second print control module; a recording unit configured to, if the printer type information obtained by the first and second obtaining units is identical to each other, record the version information on a newer one of the versions of the first and second control modules in correspondence with the printer type information as correspondence information; a recognition unit configured to recognize printer type information on a printer type of a certain printer; a selection unit configured to select the version information recorded in correspondence with the printer type information recognized by the recognition unit by referring to the correspondence information recorded by the recording unit; and an execution unit configured to execute one of the first and second print control modules for the version information selected by the selection unit.

Other features and advantages of the present invention will be apparent from the following description taken in conjunction with the accompanying drawings, in which like reference characters designate the same or similar parts throughout there of.

BRIEF DESCRIPTION OF THE DRAWINGS

FIG. 4 shows the version of each print processing module and information on printers supported by each print processing module in the printing system;

FIG. 6 is a table representing a print controlling module management table for managing version information and supported printers for each print controlling module;

FIG. 14 shows a result of processing the module management table in the block diagram of the printer driver;

FIG. 15 shows a result of processing the module management table when a printer driver that does not utilize the module management table is added to the block diagram of the printer driver;

FIG. 16 shows a relationship between printer drivers and printers supported by the printer drivers determined from the module management table in FIG. 14;

FIG. 17 shows a relationship between printer drivers and printers supported by the printer drivers determined from the module management table in FIG. 15;

FIG. 22 shows a support information table having information on printers controllable by printer drivers;

FIG. 26 shows a printer driver management table A that is generated in the exemplary environment for executing an installer in FIG. 20;

FIG. 27 shows a printer driver management table A that is generated in the exemplary environment for executing an installer in FIG. 21;

FIG. 28 shows a printer driver management table B that is generated in the exemplary environment for executing an installer in FIG. 20; and FIG. 29 shows a printer driver management table B that is generated in the exemplary environment for executing an installer in FIG. 21.

DETAILED DESCRIPTION OF THE PREFERRED EMBODIMENTS

In the following, the embodiments of the invention will be described in detail with reference to the drawings.

Figure 1:
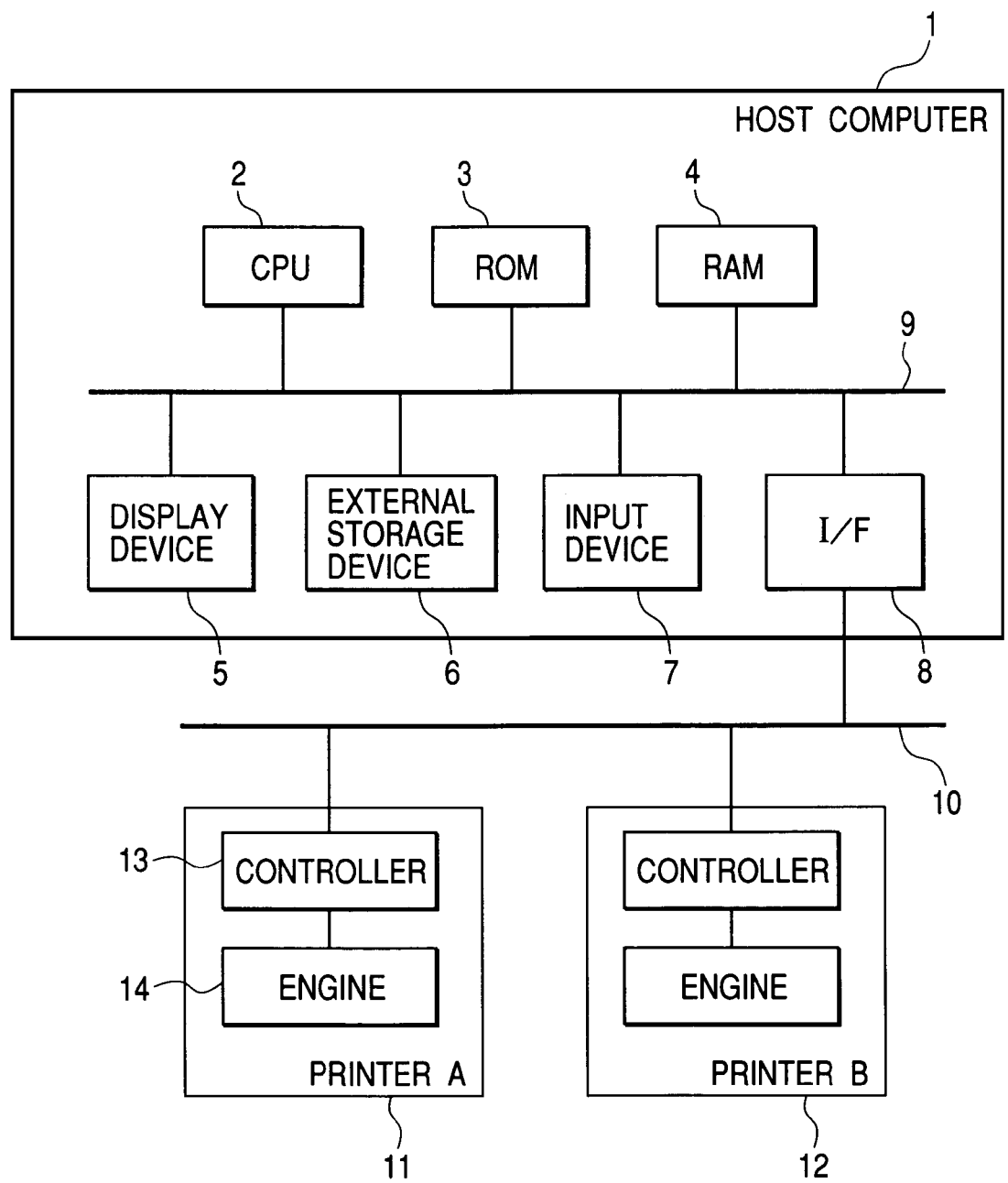
FIG. 1 is a block diagram showing the configuration of a printing system as an embodiment of the invention.

FIG. 1 shows a block diagram illustrating the configuration of the printing system as an embodiment of the invention. In the FIG. 1, 1 designates a host computer, to which printers A11 and A12 are connected through a communication bus 10 such as LAN and USB. Although only two printers are shown in FIG. 1, any number of printers can be connected through the communication bus 10.

The printers A11 and A12 are ink jet printers each having a printer controller 13 and a printer engine 14, capable of outputting images, characters and graphics onto a printing medium of various sizes by printing. The printer controller 13 refers to a control circuit and a program for controlling an entire printer, whereas the printer engine 14 refers to a mechanism itself that is responsible for scan of the head of the ink jet printer and conveying a printing medium. Each of the printers 11 and 12 has an ink jet cartridge, which is a combination of ink tanks for each color that hold ink to be supplied to the head of the ink jet head. Although ink jet printers are considered as a printer as an image forming apparatus that is an example of the peripheral device of the invention, this is not limitation, but the image forming apparatus of the invention may be a laser printer, facsimile, copier or a machine combining them.

Within the host computer 1, 2 designates CPU, which, during start-up time, loads an operating system (hereinafter in figure, also indicated as OS) stored in an external storage device 6 such as a hard disk and CD-ROM to RAM 4 and executes it to control the system in accordance with a program stored in ROM 3. 5 designates a display device such as CRT and LCD, which can realize various ways of display in accordance with control by the CPU 2. 7 designates an input device such as a keyboard and mouse, performing input to the CPU 2 in various manners. 9 designates an internal bus of the host computer, enabling data communication among the CPU 2, ROM 3, RAM 4, display device 5, external storage device 6, input device 7, and external I/F 8.

In the external storage device 6, various programs are stored such as application programs and printer drivers in addition to the operating system. The CPU 1 executes various application programs and executes printer drivers corresponding to the printers A11 and B12 in accordance with the control by the operating system, translating drawing data for application programs to printer controlling commands that can be executed by the printers A11 and B12. The printer controlling commands generated by the CPU 1 based on the control by the printer drivers are output to the communication bus 10 via the I/F 8 and sent to the printer A11 or B12. The printer A11 or B12 thus receives the printer controlling commands sent by the host computer 1 and carries out printing.

Figure 2:
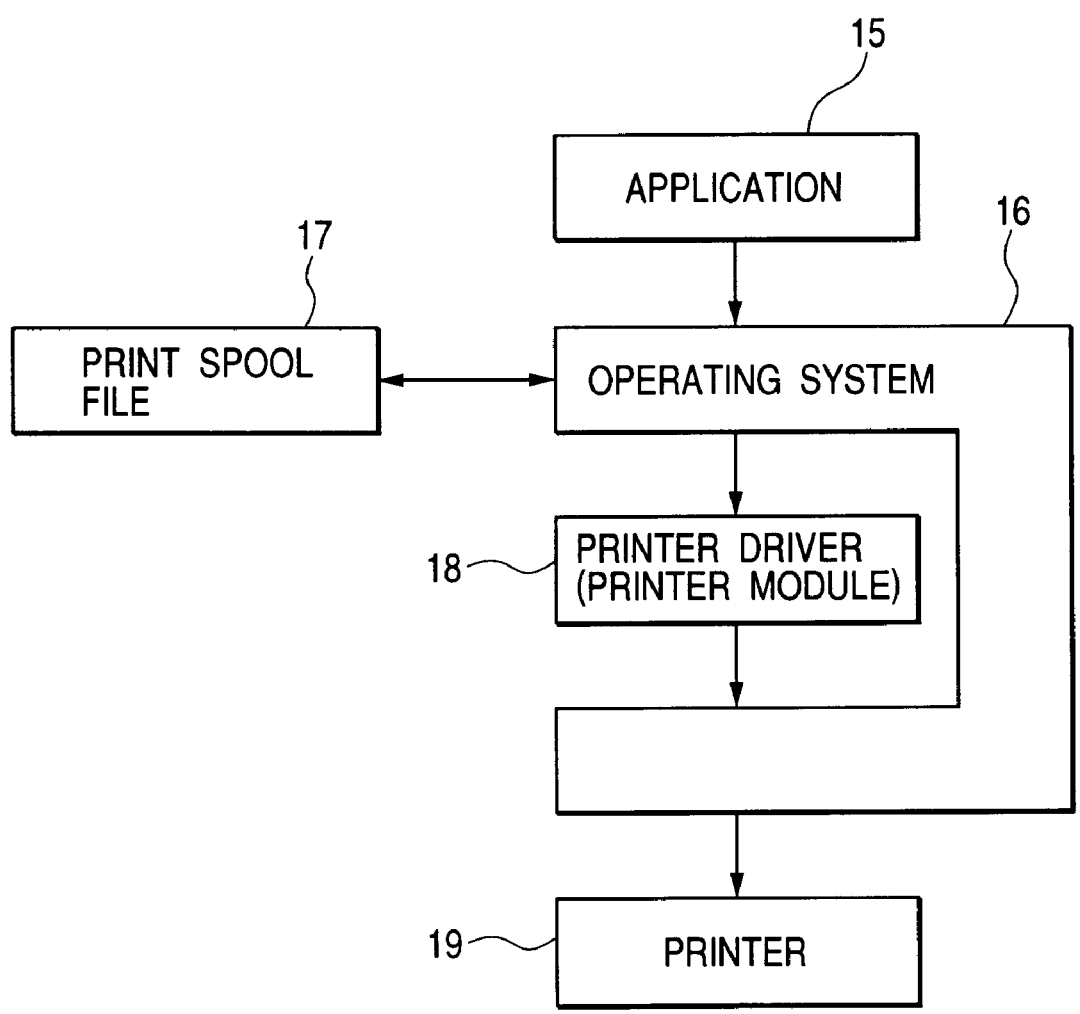
FIG. 2 is a block diagram showing printing processing by an operating system in the printing system.

In the example, MacOSX (a trade name) is considered as the operating system executed in the host computer 1, for example. FIG. 2 shows an internal block diagram for a program execution module involved in printing operation in the OS. An application 15 passes drawing data that has been previously generated with a user's operation to the operating system 16 and also requests it to perform printing processing. The operating system 16 saves the drawing data passed from the application in a print spool file 17. After receiving all drawing data from the application and saving it to the print spool file 17, the operating system 16 loads a printer driver (in the example, referred to as printer module) 18 corresponding to the printer to which the data will be output. The operating system 16 loads the drawing data from the print spool file 17 and performs band processing to generate rasterized data equivalent to one band. The operating system 16 passes the generated rasterized data to the printer driver 18 and requests it to process the data. The printer driver 18 translates the rasterized data to printer commands and outputs it to the printer 19 utilizing the communication capability of the operating system 16. The printer 19 prints the data based on the printing commands generated in such a manner.

Figure 3:
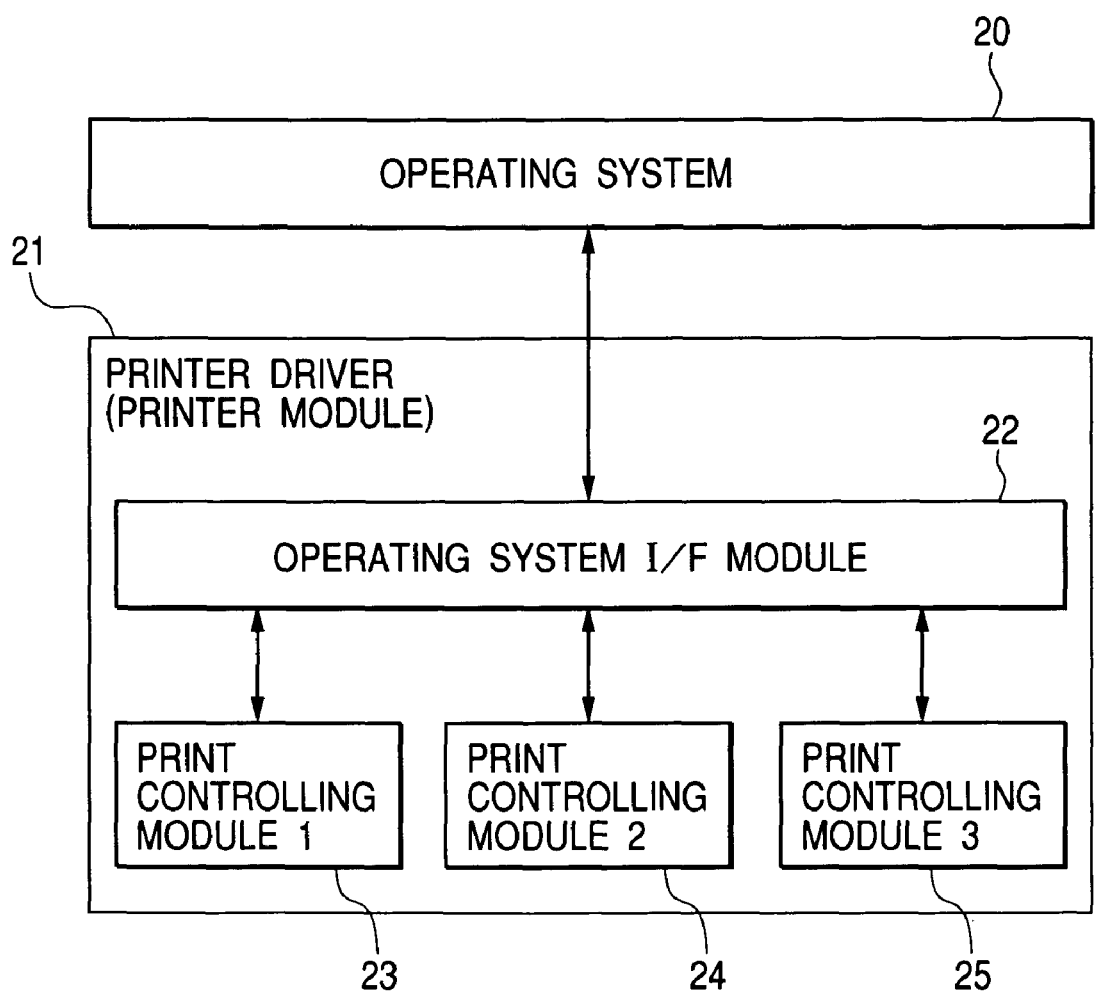
FIG. 3 is a block diagram showing the configuration of a printer driver in the printing system.

FIG. 3 shows a block diagram illustrating the details of a printer driver. The printer driver consists of an operating system I/F module 22 and one or more print controlling modules. The operating system I/F module 22 and the print controlling modules are separate files. Addition of a print controlling module can easily improve the functions of the printer driver.

The operating system I/F module 22 is responsible for handling interface portion with the operating system and managing and executing print controlling modules. A print controlling module is executed from the operating system I/F module 22, and translates data passed from the operating system to printer controlling commands. One to any number of print controlling modules can exist depending on the version of their program and are managed by the operating system I/F module 22. In the example, three printer controlling modules 23, 24 and 25 exist as shown in FIG. 3.

FIG. 4 shows the version of each of the print controlling modules and printer models supported by them. The print controlling module 1 is version 1.0.0 and supports printers A, B and C. The print controlling module 2 is version 2.0.0 and supports printers A, B and D. The print controlling module 3 is version 3.0.0 and supports printers A and E. A module with a larger version number is a newer module. These print controlling modules are capable of returning their version and information on printer models they support in response to query by the operating system I/F module 22.

With the OS of the embodiment, a user registers a printer to be used for printing by means of a print center, which is an application of the OS, before printing from an application. It means that the user can perform printing only with a printer that is registered with the print center and listed in the print center. The print center searches for printer modules, which are printer drivers in the OS of the embodiment, to query about the communication bus format supported by each printer module and printer model information as an example of information indicating printer functions. The print center compares the query result with the name of printer models now connected to the host computer to associate connected printers with corresponding printer modules. A connected printer can be registered from the screen of the print center only when a printer module corresponding to the printer resides in the system.

When the user registers a printer by operating the print center, the registered printer and information on a printer driver corresponding to the printer are saved as internal information for the operating system. When printing is performed from an application, the operating system can load and execute the printer module corresponding to the printer by referring to the internal information.

Figure 5:
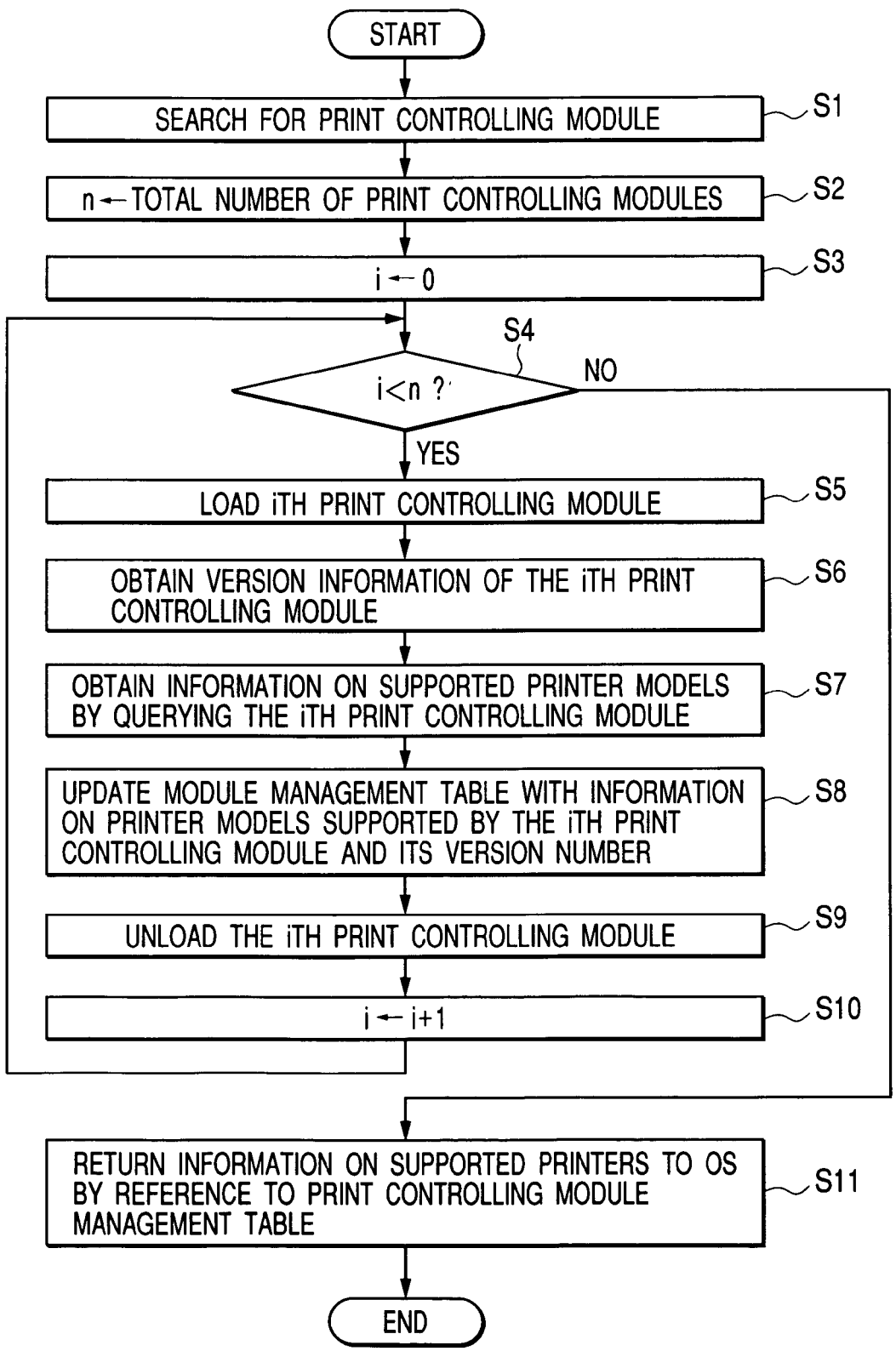
FIG. 5 is a flowchart showing the process of an operating system I/F module for printer drivers in the printing system generating a print controlling module management table for managing version information and supported printers for each print control module.

FIG. 5 is a flowchart showing processing performed by the operating system I/F module 22 in a printer driver when it returns information on printers supported by the printer driver to the operating system based on versions and information on supported printers as an example of information indicating printer functions that has been returned from each print controlling module, in response to a query by the operating system.

At step S1, the operating system I/F module 22 searches for print controlling modules that reside in an external storage device. This search can be realized by installing print controlling modules in a predefined directory and searching the directory for executable files by the operating system I/F module, for example. At step S2, the total number of print controlling modules found in the search is stored in a variable n. At step S3, a counter variable i is initialized to zero. At step S4, the counter variable i is compared with the total number of print controlling modules n. If i<n, the procedure proceeds to step S5. At step S5, one of the print controlling modules is loaded. At step S6, an inquiry is made to the print controlling module about its version information and the information is obtained. In the case of the print controlling module 1, for example, information of the version 1.0.0 is obtained. At step S7, information on supported printers is requested from the print controlling module and obtained. For the print controlling module 1, for example, information on the printers A, B and C will be obtained. At step S8, the print controlling module management table which stores the correspondence between supported printers and a print controlling module of the newest version is updated with the version of the print controlling module and the information on supported printers.

FIG. 6 shows a print controlling module management table. The print controlling module management table includes supported printers, information on the identification of corresponding print controlling modules, and version information for the print controlling modules.

Figure 7:
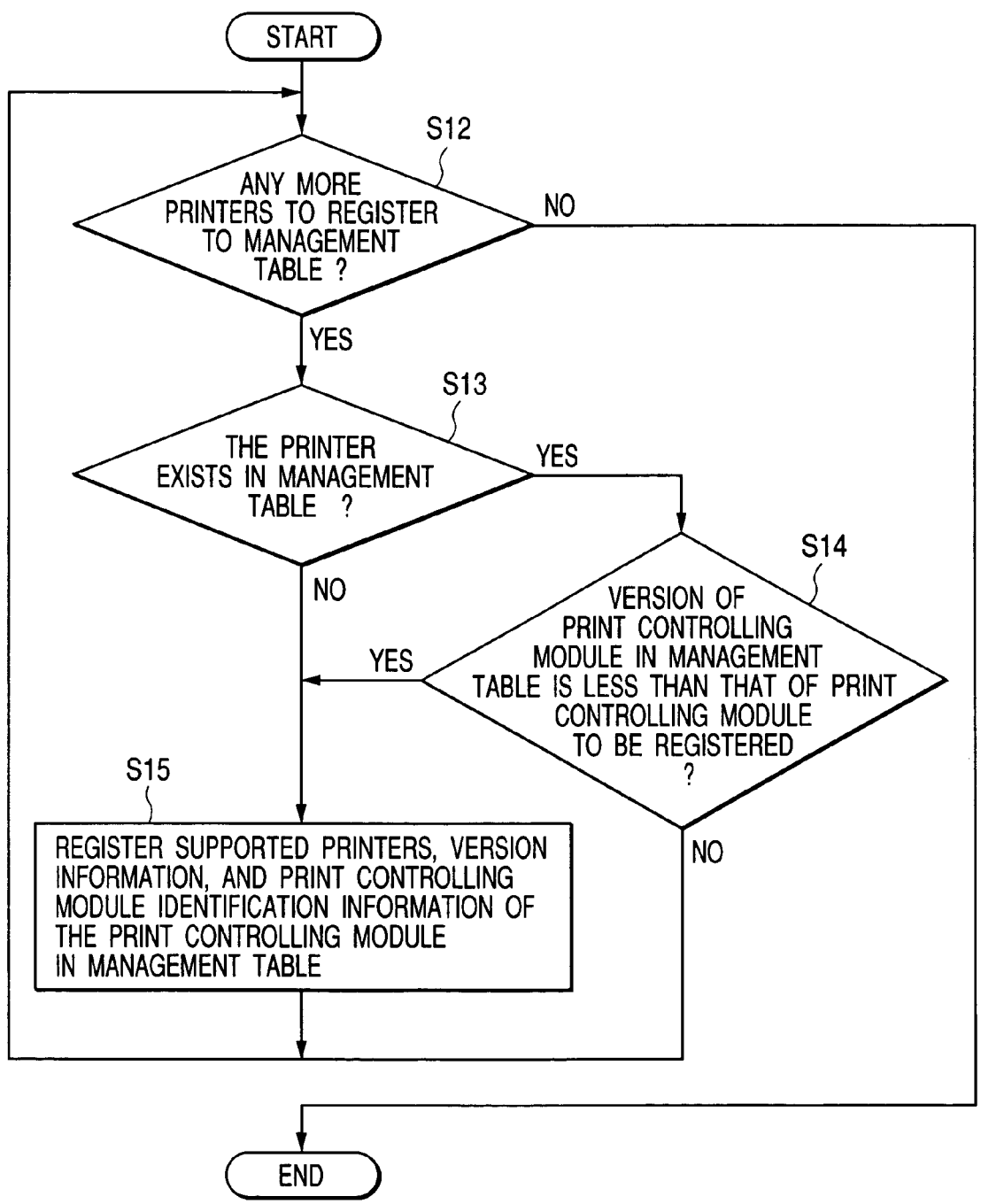
FIG. 7 is a flowchart illustrating the details of processing of generating the print controlling module management table in the flowchart in FIG. 5.

The flowchart in FIG. 7 shows the details of step S8 in FIG. 5. At step S12, check is made to see if any of the printers supported by the print controlling module is unregistered with the print controlling module management table, and if any, the procedure proceeds to processing at step S13 and subsequent steps. If information on the printer in question does not exist in the print controlling module management table at step S13, information on the printer need only to be stored in the print controlling module management table, and the procedure proceeds to step S15 for the processing. If information on the printer in question exists in the print controlling module management table, the procedure proceeds to step S14. At step S14, the version of the print controlling module that has been already registered with the print controlling module management table in regard to the printer in question is compared with the version obtained from the print controlling module now being processed. If the version obtained from the print controlling module being processed is newer, the procedure proceeds to step S15. At step S15, information on the printer in the print controlling module management table is updated with identification information and version information for the print controlling module being processed. After step S15, or if the version of the print controlling module being processed is older at step S14, the procedure returns to step S12 to perform processing for the next supported printer. If it is determined that any more supported printer that has not been processed does not exists for the print controlling module at step S12, the procedure proceeds to step S9 in FIG. 5.

At step S9 in FIG. 5, the print controlling module is unloaded. Then, at step S10, the counter for print controlling modules is incremented. And the procedure returns to step S4 to perform the same processing for the next print controlling module and update the print controlling module management table. If it is determined that all print controlling modules have been processed at step S4, the procedure proceeds to step S11.

At step S11, information on printers supported by the printer driver is returned to the operating system by referring to the print controlling module management table. There are three print controlling modules in the example, the version and printers supported by them shown in the table in FIG. 4. And the final result of registering information about all the print controlling modules in the print controlling module management table is shown in the table of FIG. 6. The table in FIG. 6 shows that a printer driver with the configuration shown in the block diagram in FIG. 3 is capable of controlling printing by five models of printers, i.e. printers A, B, C, D and E, and that the print controlling module 3 should be used to control the printer A, the print controlling module 2 for the printer B, the print controlling module 1 for the printer C, the print controlling module 2 for the printer D, and the print controlling module 3 for the printer E.

In this example, the operating system I/F module 22 returns information that five models of printers A, B, C, D and E are supported to the operating system. This allows these printers to be registered via a dialog in the print center provided that these printers are connected to the system. In the printing system of the example shown in FIG. 1, the printers A and B can be registered, and if the user selects those printers by operating the print center, application data can be translated to printer commands to be outputted.

As printing is executed by operating the application, the operating system loads and executes the operating system I/F module 22 based on information on the correspondence between the printers and the printer drivers that has been reserved upon registration with the print center in executing the printing.

Figure 8:
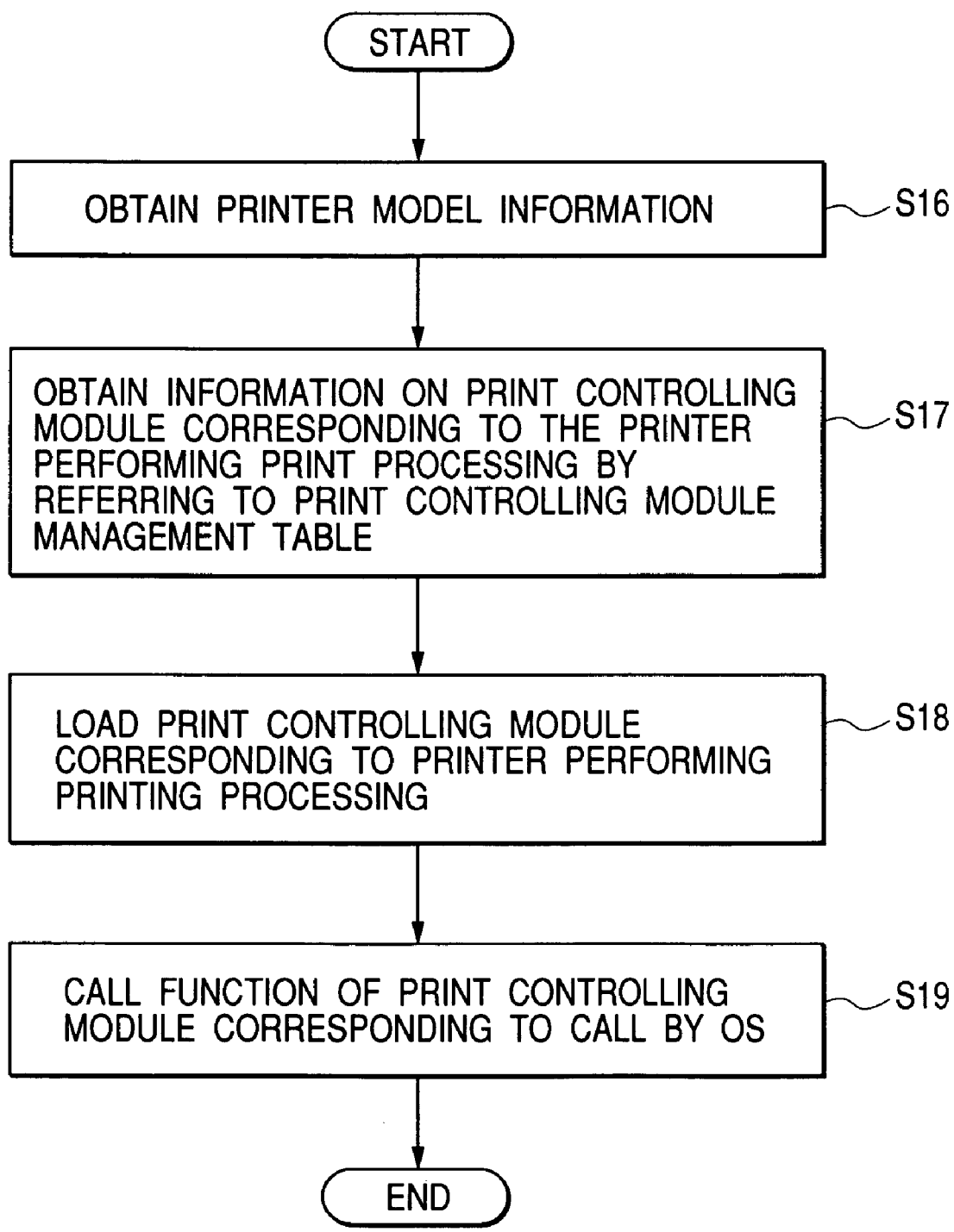
FIG. 8 shows the processing of the operating system I/F module for printer drivers selecting and executing a print controlling module of the newest version that supports the target printer by using the print controlling module management table.

FIG. 8 is a flowchart for the operating system I/F module 22 showing how printing processing is carried out when the operating system I/F module 22 is executed by the operating system in printing drawing data for an application. At step S16, printer model information is obtained. Since a printer that has I/F for USB and thus is connectable to a USB bus is capable of returning an IEEE 1284 device ID, the model name of such a printer can be acquired as a printer model (MDL:) with the device ID. With the OS of the embodiment, a printer driver may refer to the name of a printer model that has been obtained in advance by the operating system with its device ID. At step S17, identification information for a print controlling module corresponding to the printer that performs printing is obtained by referring to the print controlling module management table shown in FIG. 6. At step S18, the print controlling module corresponding to the printer is loaded. At step S19, a function for the print controlling module that corresponds to a call from the operating system is called and executed.

With the processing above, the newest print controlling module is executed that corresponds to the selected printer based on a call by the operating system, and drawing data for an application is translated to printer commands to be output to the printer.

Figure 9:
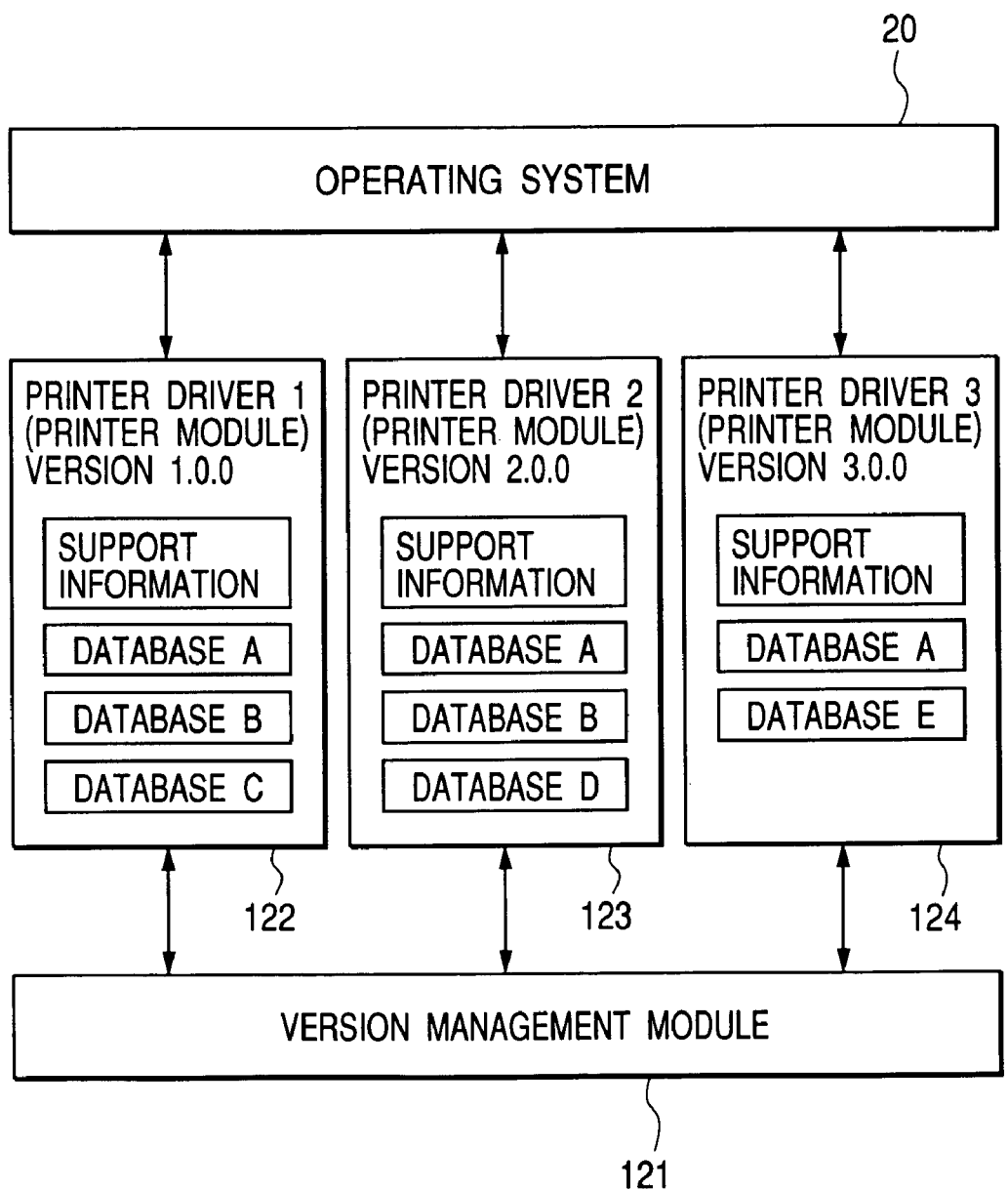
FIG. 9 is a block diagram showing the configuration of a printer driver in the printing system as another embodiment of the invention.

FIG. 9 shows a block diagram of the configuration of a printer driver according to another embodiment of the invention. This example also operates as a printer driver in the printing system in FIG. 1. Also, when the OS of the embodiment is considered, the printer driver operates as a printer driver for controlling printing in the operating system in FIG. 2. The printer driver of the example consists of a printer driver which stores a main program for printing control and a version management module. FIG. 9 shows an example that has three versions of printer drivers 1, 2 and 3, and a version management module 121.

Unlike the example above, the example has a configuration in which a module for managing the versions of control programs can be designed being separated from the specification of I/F with the operating system. By providing only the portion for version management as a library, when the system of managing information on supported models in a printer driver has been changed, the change can be easily accommodated by updating only the version management module. In addition, the library can be used in a generic manner such as linkage to the library for a case where a program for installing a printer driver wants to obtain information on printers supported by the printer driver. While in the above-mentioned example it is required for the operating system to determine which version of print controlling module to execute and switch to the module every time it calls a function for a printer driver in executing printing processing, this example eliminates the necessity of switching and reduces printing processing overhead. Also, the example is intended to operate concurrently with conventional printer drivers not according to the invention.

Figures 10, 11:
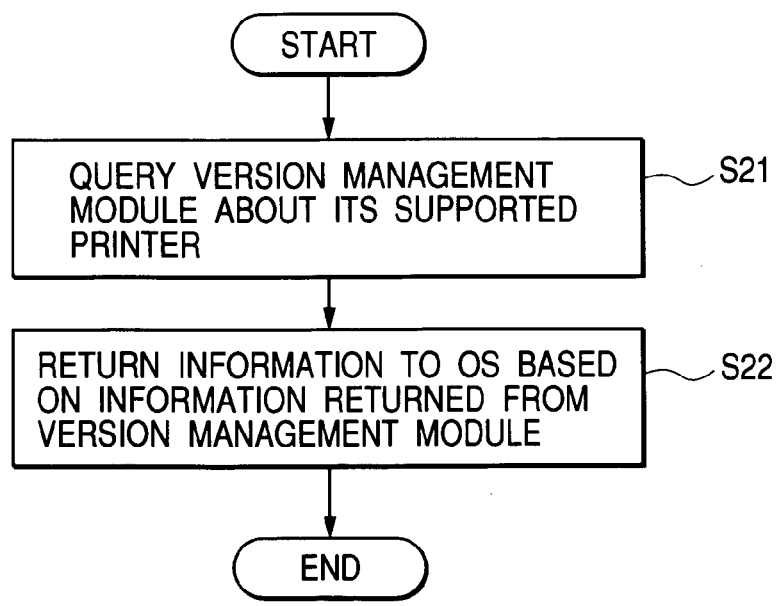
FIG. 10 shows the version of each printer driver and information on printers supported by each printer driver in the block diagram of a printer driver above.
FIG. 11 shows processing by the printer driver upon being queried about its supported printers by the operating system.

In this example, a printer driver has a support information file that stores information on printer models it can support. FIG. 10 shows content of each of the support information files for the printer drivers 1, 2 and 3. The printer driver 1 of the version 1.0.0 can control three models of printers A, B and C. The printer driver 2 of the version 2.0.0 can control three models of printers A, B and D. The printer driver 3 of the version 3.0.0 can control printers A and E.

The printer driver also has a database file. The database file stores information indicating printer functions, commands for controlling a printer, and color conversion table based on ink property of a printer. The printer driver 1 has databases A, B and C for controlling printers A, B and C. The printer driver 2 has databases A, B and D for controlling printers A, B and D. The printer driver 3 has databases A and E for controlling printers A and E. Database files a printer driver has can be learned from the support information file shown in FIG. 10.

In the example, upon receiving a query about supported models from the operating system, the printer driver performs processing based on the flowchart in FIG. 11. At step S21, the printer driver queries the version management module about information on models it should support. At step S22, based on information returned from the version management module, the printer driver returns information on printer models it supports to the operating system.

Figure 12:
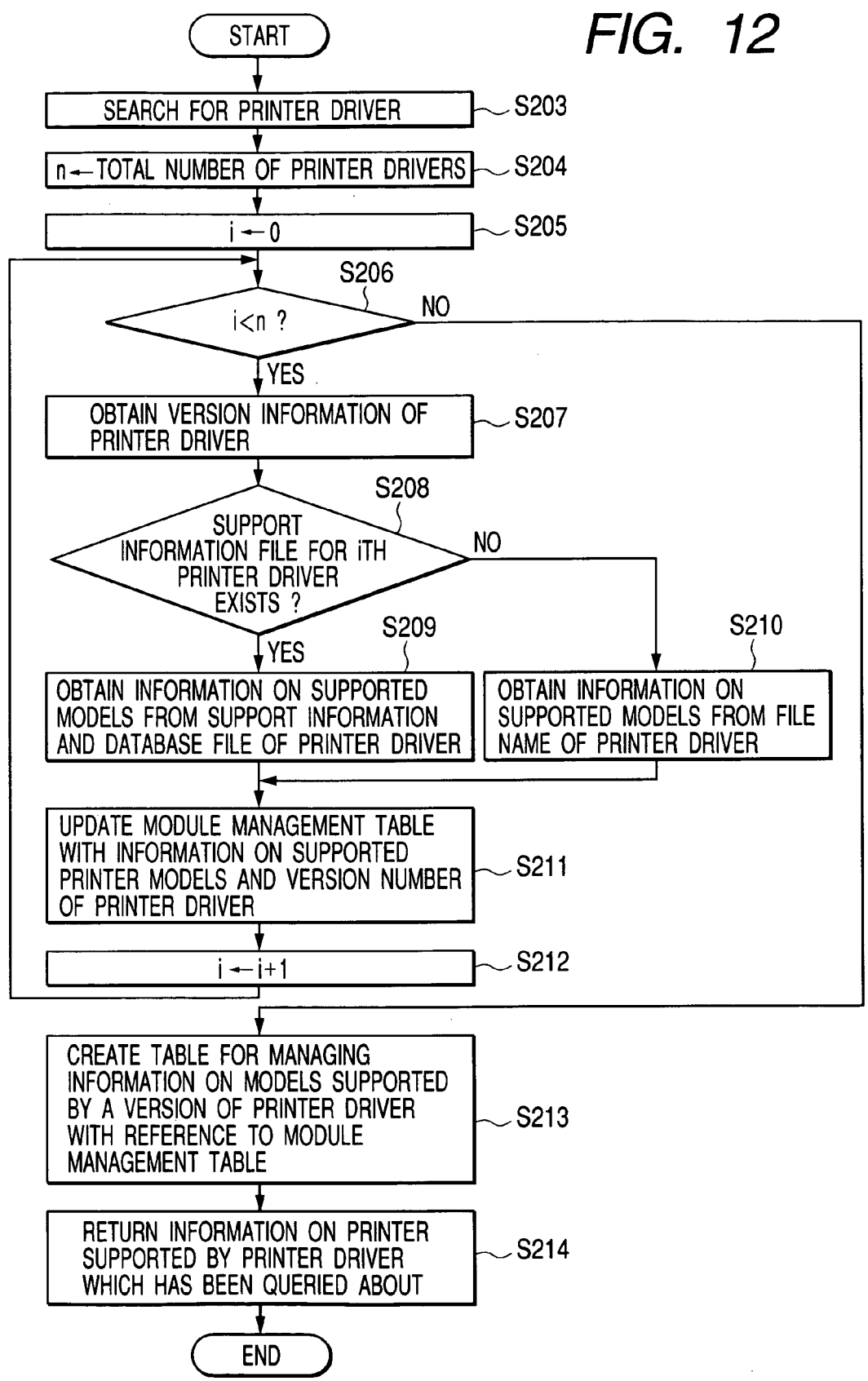
FIG. 12 shows processing by the version management module upon being queried by a printer driver about information on models that should be supported by the printer driver.

FIG. 12 is a flowchart showing processing by the version management module when a printer driver queries it about information on printer models supported by the printer driver.

At step S203, the version management module searches for printer drivers residing in the external storage device. This processing can be performed by installing printer drivers in a predetermined directory and searching for executable files in the directory by the version management module. At step S204, the total number of printer drivers found in the search is stored in a variable n. At step S205, a counter variable i is initialized to zero. At step S206, the counter variable i is compared with the total number of print processing modules n. If i<n, the procedure proceeds to step S207. In the OS of the embodiment, a printer driver is configured with a hierarchical directory structure called bundle. At step S207, a file under the directory for the ith printer driver that describes its version information is referred to and version information is obtained. At step S208, a support information file is searched for under the directory for the ith printer driver. If the support information file is not found, the ith printer driver is considered to be a printer driver that is not according to the invention, i.e. one that does not utilize the version management module, where the procedure proceeds to step S210. If the support information file is found, the printer driver is considered as a printer driver according to the invention that utilizes the version management module and the procedure proceeds to step S209. At step S209, information on printers the printer driver can control and the name of its database file, which are described in the support information file, are obtained. Then, a database file for the target model is searched for under the directory for the printer driver, and, if the database is found, it is determined that the printer in question can be controlled. If the support information file describes information on multiple printer models, the process will be repeated.

Meanwhile, at step S210, since the printer driver is considered to be a printer driver of the type not according to the invention, models supported by the printer driver are obtained from the file name of the printer driver. This can be done, for example, by referring to a table associating printer drivers with printer models that may be provided by the version management module. If the name of a printer model is contained in the file name of the printer driver, the version management module can obtain the name of a supported model from the file name.

At step S211, the module management table is updated with information on printer models supported by the ith printer driver and the version number of the printer driver.

FIGS. 14 and 15 show the structure of the module management table. The module management table includes information on printer models, version numbers of printer drivers, information indicating if the printer driver is the inventive one that calls processing by the version management module, and information identifying printer drivers. Information identifying printer drivers is reference information on printer drivers managed by the operating system.

Figure 13:
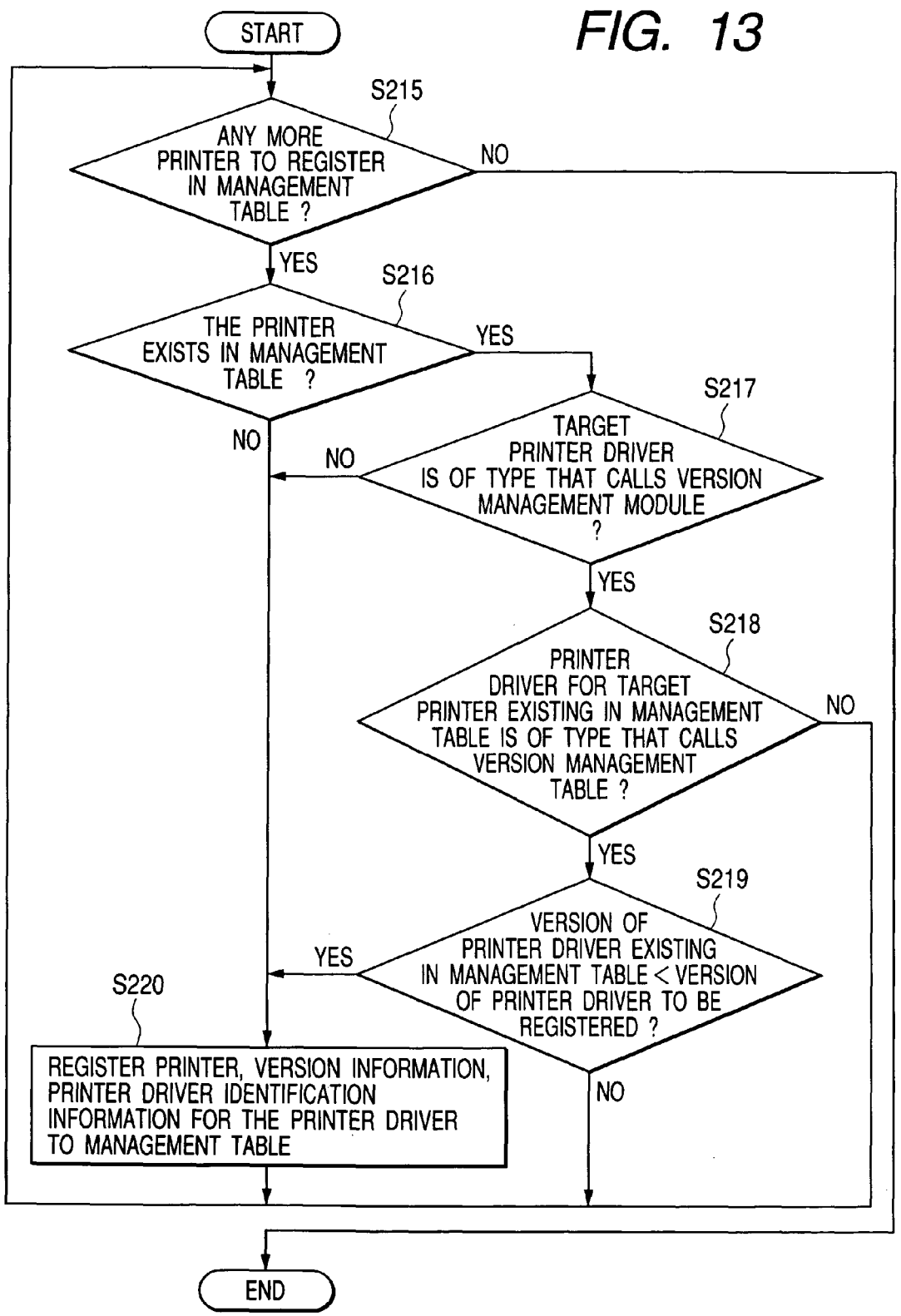
FIG. 13 shows processing of updating the module management table in the flowchart in FIG. 12.

FIG. 13 is a flowchart illustrating step S211 in greater detail. At step S215, it is checked if any of printers obtained at step S209 or S210 is unregistered with the module management table. If any, the procedure proceeds to step S216. At step S216, it is checked if information on the printer to be registered is already registered with the module management table. If the printer in question does not exist in the module management table at step S216, information on the printer to be processed need only to be registered with the module management table and the procedure proceeds to step S220. If the printer in question exists in the module management table, the procedure proceeds to step S217. At step S217, it is checked if the printer driver being processed has been a printer driver of a type that calls the version management module at step S208. If the printer driver is one that does not call the version management module, the procedure proceeds to step S220 to update the module management table. If the printer driver is of a type that calls the version management module, the procedure proceeds to step S218. At step S218, it is checked if the printer driver for the printer in question that exists in the module management table is of the type that calls the version management table. If the printer driver is of the type that calls the version management table, the procedure proceeds to step S219. If the printer driver is not of the type that calls the version management table, the module management table is not updated and the procedure returns to step S215. At step S219, for the printer in question, the version of the printer driver already registered in the module management table is compared with that of the printer driver being processed. If the version of the printer driver being processed is newer, the procedure proceeds to step S220. At step S220, information for the corresponding printer in the module management table is updated with identification information and version information for the printer driver being processed.

Information indicating whether the printer driver is of the type that calls the version management module is also recorded. After step S220, or the version of the target printer driver is older at step S219, the procedure returns to S215 to perform the same processing for the next printer supported by the printer driver being processed.

After registering all information on printer models supported by the ith printer driver in the module management table, the procedure proceeds to step S212 in FIG. 12 to increment the counter variable i and returns to step S206. If there is any printer driver to be processed next at step S206, processing at step S207 and subsequent steps is repeated. At step S206, if it can be determined that all printer drivers have been processed, the procedure proceeds to step S213.

At step S213, information on printers supported by the printer driver which has been queried about is generated by referring to the module management table. In the example in FIG. 9, there are three printer drivers, and the version of each printer driver and printer modules they can support are shown in the table in FIG. 10. The module management table in which information about all the printer drivers is registered is shown in FIG. 14. FIG. 14 shows that when there are three versions of printer drivers as in FIG. 9, the printer driver 1 should support printer C, the printer driver 2 should printers B and D, and the printer driver 3 should support printers A and E, which is shown in the table in FIG. 16.

Now, a case will be described where an additional printer driver 4 which supports printer A and does not utilize the version management module exists in the configuration in FIG. 8. The printer driver is the version 0.5.0. A printer driver that does not utilize the version management module is registered in the module management table through processing in the flowchart in FIG. 13 in preference to one that utilizes the version management module. The purpose of this is to allow printer drivers to operate in a manner conforming to the specification of the operating system even when a user operates an installer for a printer driver and printer drivers of both types exist concurrently. The result of processing the module management table in such a case is shown in FIG. 15. A printer driver corresponding to printer A is the printer driver 4 of the version 0.5.0. As a result, the printer driver 1 should support printer C, the printer driver 2 should printers B and D, and the printer driver 3 should support only the printer E, which is shown in FIG. 17.

At step S214, information on printer models that should be supported by the printer driver which has been queried about is generated and returned to terminate processing.

In such a manner, the version management module determines printer models which each version of printer driver should support and returns them to the printer driver, and based on the information, the printer driver returns information on models it supports to the operating system.

The operating system associates connected printers with printer drivers based on supported model information for each printer driver. In the OS of the invention, it is the print center that associates connected printers with printer drivers. Assume here that printers A, B, C, D and E are connected to the host computer. The printers A, B, C, D and E can be registered in the print center. With the printer driver configuration shown in FIG. 9, the print center queries the printer drivers 1, 2 and 3 about information on their supported models, and based on information returned, it associates the printer driver 3 with printer A, printer driver 2 with printer B, printer driver 1 with printer C, printer driver 2 with printer D, and printer driver 3 with printer E. With a printer driver configuration in which the printer driver 4 that does not utilize the version management module is added to the configuration in FIG. 9, the print center associates printer driver 4 with printer A, printer driver 2 with printer B, printer driver 1 with printer C, printer driver 2 with printer D, and printer driver 3 with printer E.

Printer drivers thus being associated with printers, a printer driver corresponding to each printer is loaded and executed by the operating system when the operating system performs printing processing.

As thus far described, according to each embodiment of the invention above, since a printer driver that supports multiple models of printers can be prepared and only printing processing corresponding to any of the printers can be modified by adding a new version of executable module for performing printing control, operation check need to be performed only for a target printer when performing upgrading without requirement for operation check for other printers, thus a printing system which facilitates operations of supporting and maintaining printer drivers can be provided.

According to another aspect of the invention, since a printer driver supporting multiple models of printers can be prepared and a printer is supported only when a database file for the printer exists, a printer driver whose supported models can be adjusted depending on purposes can be prepared.

According to another aspect of the invention, since the inventive printer driver can exist concurrently with a printer driver not according to the invention that has been developed with conventional art, even when a printer driver of the inventive type is introduced to a printing system that provides conventional printer drivers, a printing system can be provided that operates without inconsistency with the operating system and produces no problem when upgrading a printer driver.

As described above, according to the embodiments, since a newer version of module can be selected from multiple versions of print controlling modules or printer drivers in a printing system for controlling printing of a selected model of printer, a printing system that can perform optimal printing control can be provided.

Figure 18:
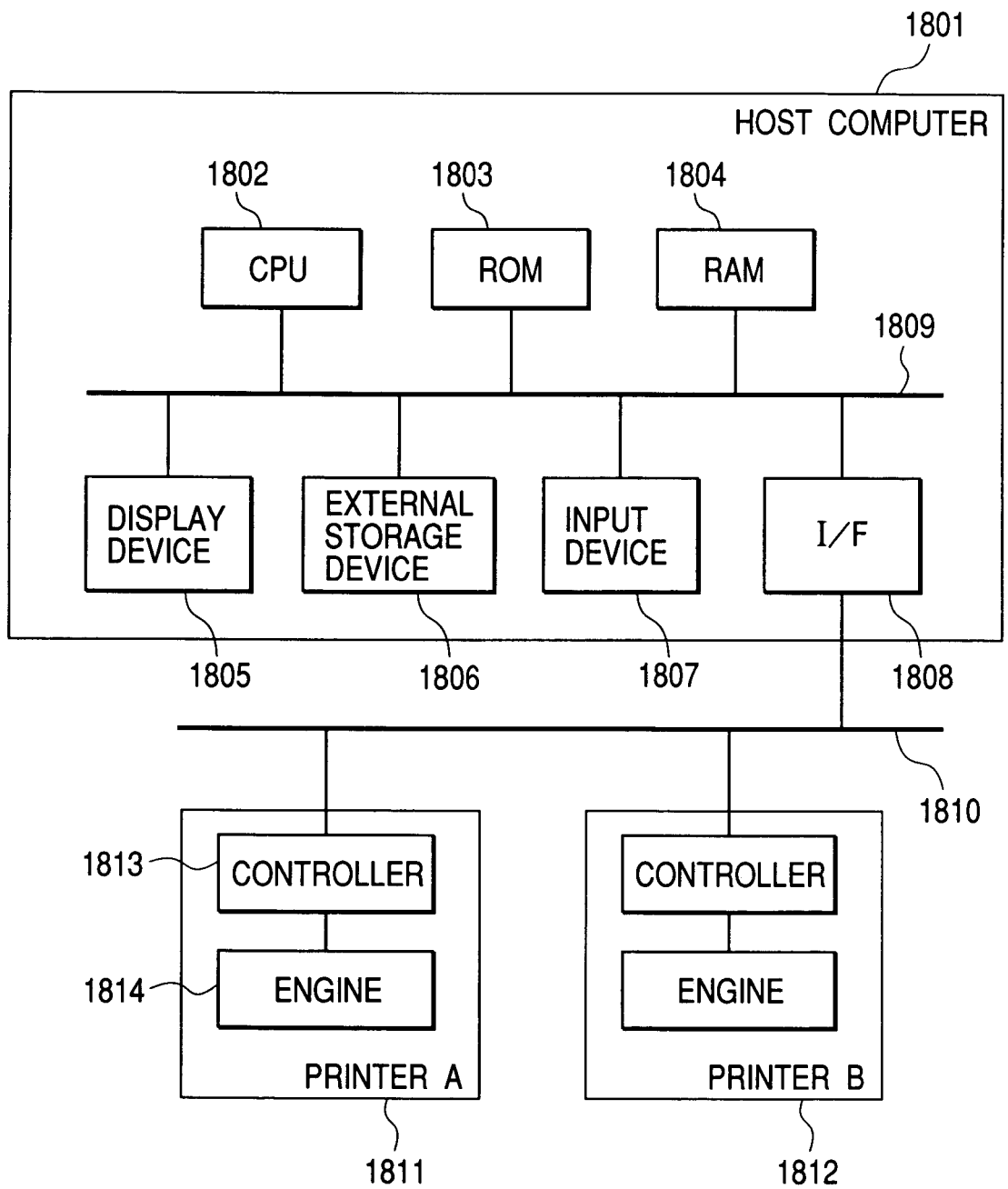
FIG. 18 is a block diagram showing an example of the configuration of the printing system that consists of a computer and printers.

FIG. 18 is a block diagram showing a printing system that consists of a computer in which a printer driver is installed and printers. In the figure, 1801 designates a host computer, to which printers A1811 and B1812 are connected through an external bus 1810 (communication bus) such as Ethernet (R) and USB. Although only two printers are shown in FIG. 18, any number of printers can be connected through the communication bus 1810.

The printers A1811 and A1812 are ink jet printers each having a printer controller 1813 and a printer engine 1814, capable of outputting images, characters and graphics onto a printing medium of various sizes by printing. The printer controller 1813 refers to a control circuit and a program for controlling the entire printer, whereas the printer engine 1814 refers to a mechanism itself that is responsible for scan of the head of an ink jet printer and conveying a printing medium. Each of the printers 1811 and 1812 has an ink jet cartridge, which is a combination of ink tanks for each color that hold ink to be supplied to the head of the ink jet head.

Within the host computer 1801, 1802 designates CPU, which loads an operating system (hereinafter in figure, also indicated as OS), stored in an external storage device 1806 such as hard disk and CD-ROM, to RAM 1804 and executes it to control the system by the program that is stored in the ROM 1803 during startup. 5 designates a display device such as CRT and LCD, which can perform various ways of display in accordance with the control by the CPU 1802. 1807 designates an input device such as a keyboard and mouse, performing input to the CPU 1802 in various manners. 9 designates an internal bus of the host computer, enabling data communication among the CPU 1802, ROM 1803, RAM 1804, display device 1805, external storage device 1806, input device 1807, and external I/F 1808.

In the external storage device 1806, various programs are stored such as application programs and printer drivers in addition to the operating system. The CPU 1802 executes various application programs and executes printer drivers corresponding to the printers A1811 and B1812 in accordance with the control by the operating system, translating drawing data for application programs to printer controlling commands that can be executed by the printers A1811 and B1812. The printer controlling commands generated by the CPU 1802 based on the control by the printer drivers are output to the communication bus 10 via the I/F 1808 and sent to the printer A1811 or B1812. The printer A1811 or B1812 thus receives the printer controlling commands sent by the host computer 1 and carries out printing.

Figure 19:
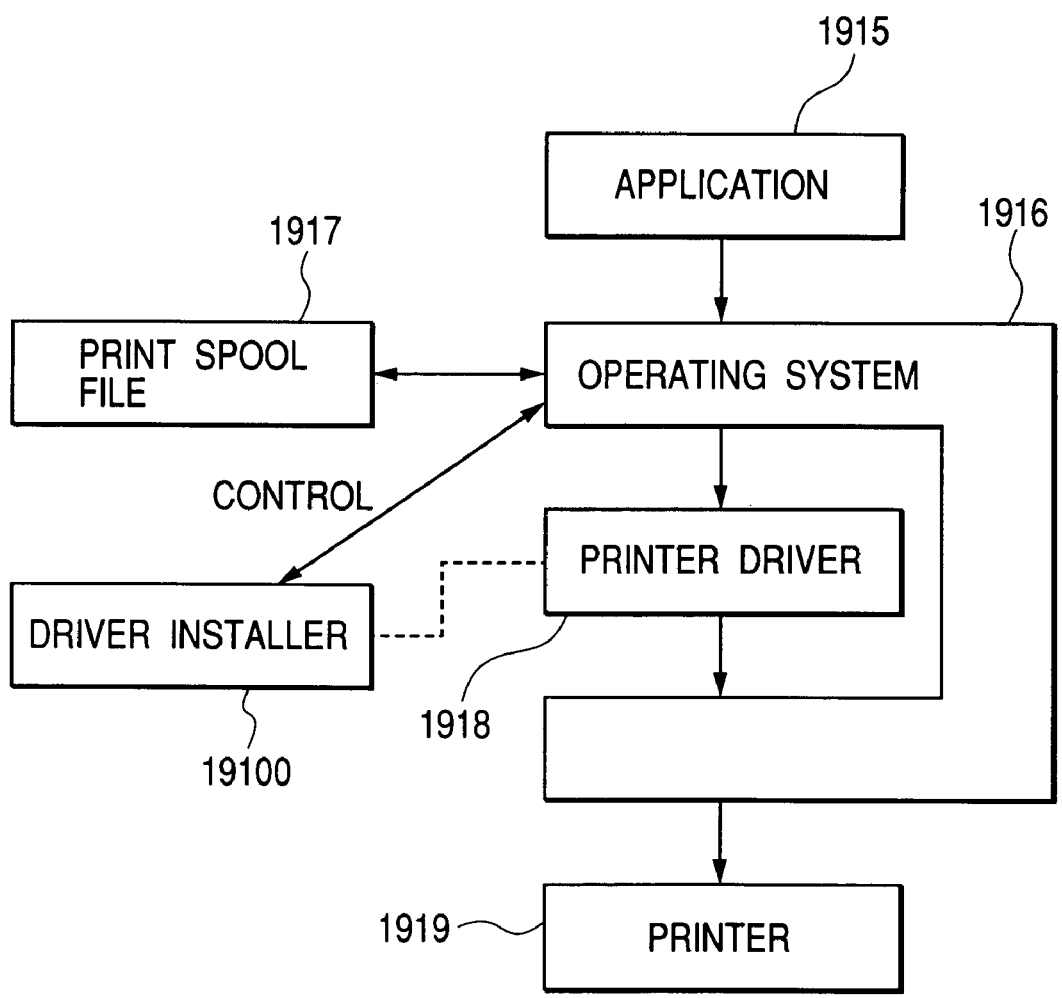
FIG. 19 is a block diagram showing printing processing via the operating system in the printing system.

FIG. 19 shows an internal block diagram of a program execution module involved with printing processing in the operating system of the computer. An application 1915 passes drawing data that has been previously generated with a user's operation to the operating system 1916 and also requests printing processing to the operating system 1916. The operating system 1916 saves the drawing data passed from the application in a print spool file 1917. After receiving all drawing data from the application and saving it to the print spool file 1917, the operating system 1916 loads a printer driver 1918 corresponding to the printer to which the data will be output. The operating system 1916 loads the drawing data from the print spool file 1917 and passes it to the printer driver 1918 and requests it to process the data. The printer driver 1918 translates the passed drawing data to printer commands and outputs it to the printer 1919 utilizing the communication capability of the operating system 1916. The printer 1919 prints the data based on the printing commands generated in such a manner.

Figure 20:
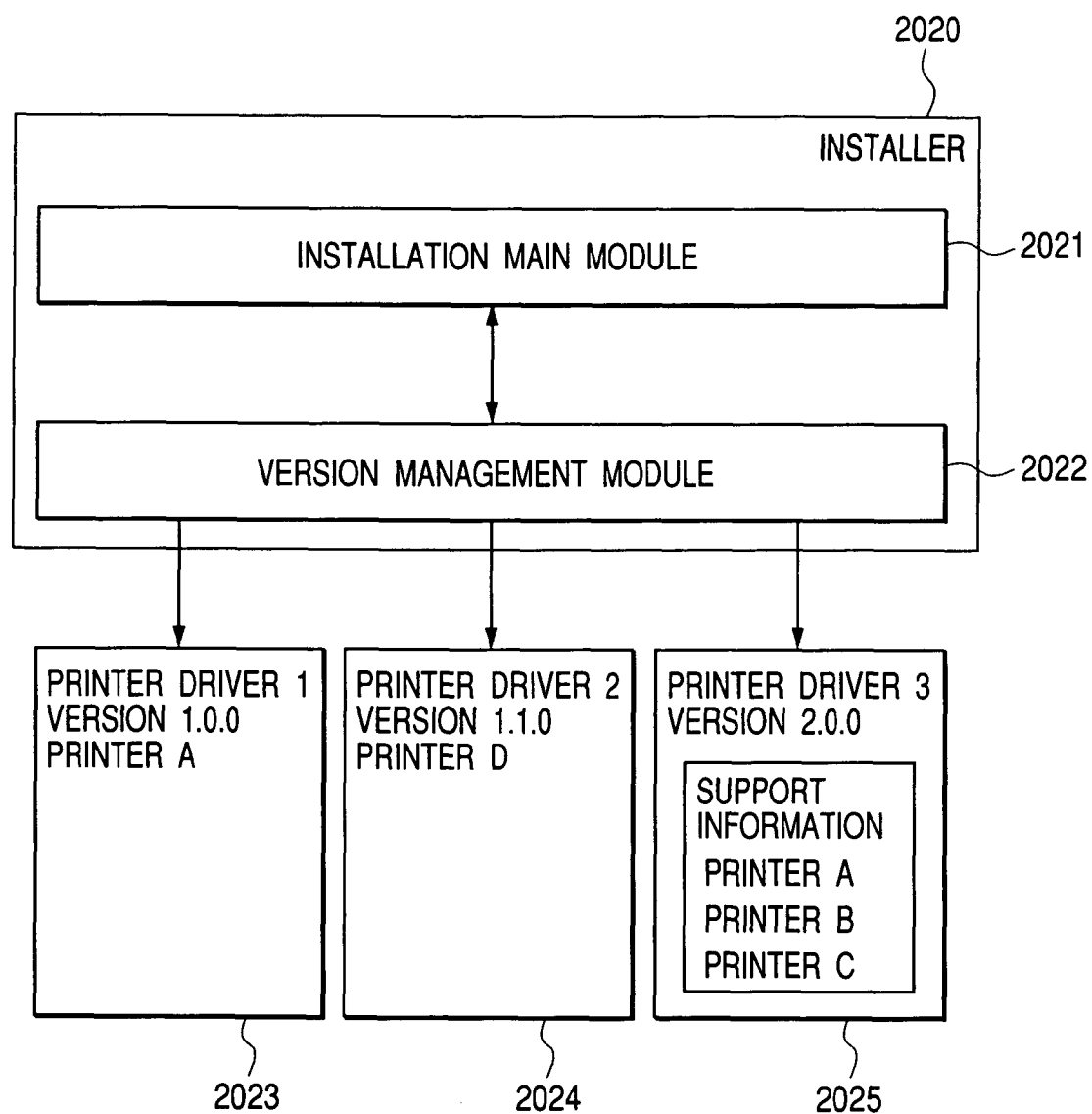
FIG. 20 is a block diagram showing an exemplary environment in which an installer is executed.

FIG. 20 shows a block diagram of an exemplary execution environment at the point the installer of the embodiment is executed. It will be described in the following using the figure. FIG. 20 illustrates a state in which additional printer driver 3 is installed on a host computer in which printer drivers 1 and 2 have been already installed. The installer 2020 consists of an installation main module 2021 responsible for execution of installation and a version management module 2022 for obtaining the versions of printer drivers and information on supported printers and processing them. The printer driver 1 is a printer driver based on a control program of the version 1.0.0, supporting printer A. The printer driver 2 is a printer driver having a control program of the version 1.1.0, supporting printer D. The printer driver 3 is a printer driver having a control program of the version 2.0.0, capable of supporting all of printers contained in the information on supported models stored in the support information table.

FIG. 22 shows the data structure of the support information table. The support information table has information on the number and model of printers supported by printer drivers. The row for the printer driver 3 in the table in FIG. 22 is for the printer driver 3, storing data on printers that can be supported by the printer driver 3. In this example, the printer driver 3 can control three models of printers A, B and C.

Figure 23:
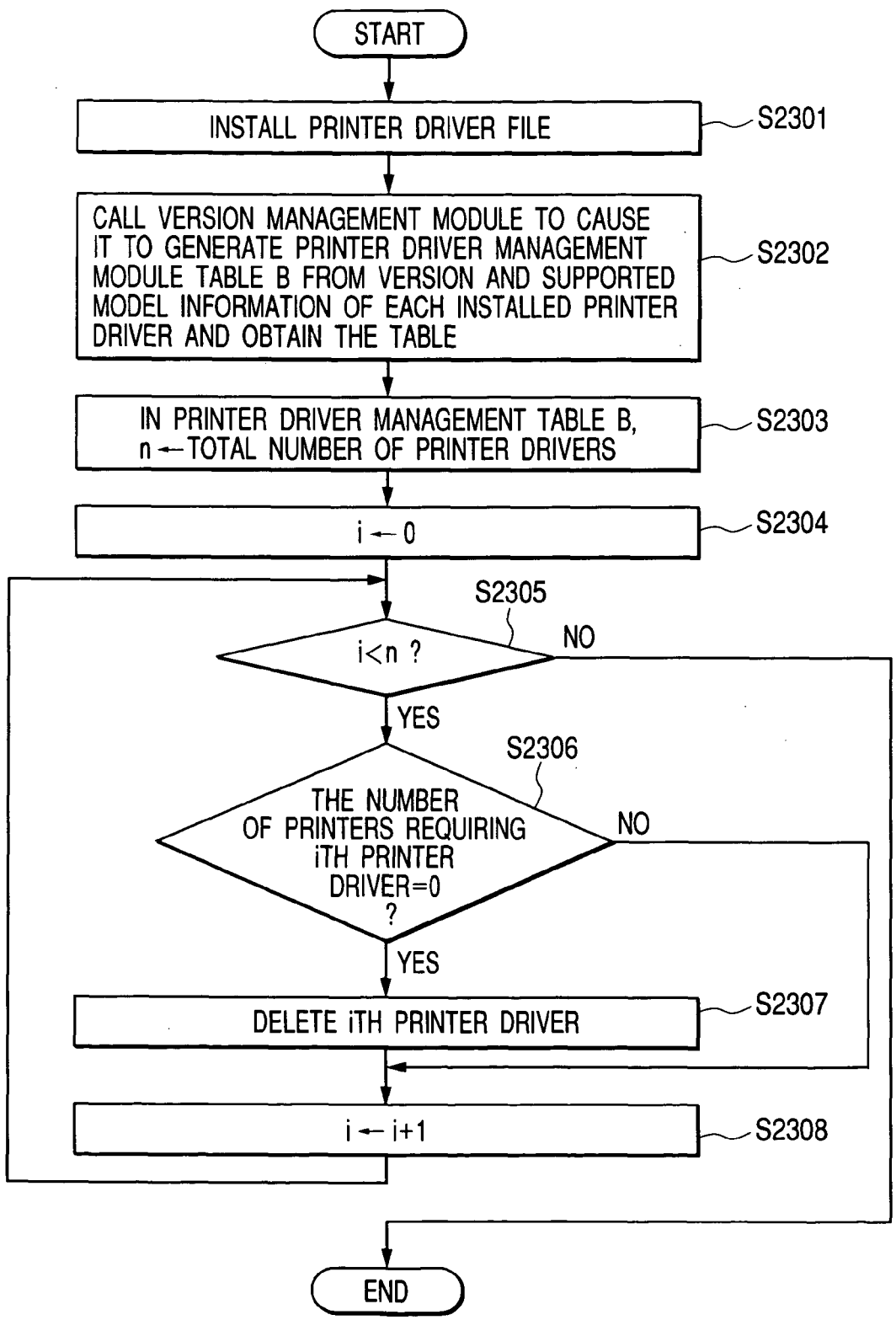
FIG. 23 is a flowchart showing processing by the installer main module.

When the installer of the embodiment is executed, first the installation main module 2021 is executed by the CPU of the host computer. FIG. 23 is a flowchart showing processing by the installation main module 2021. At step S2301, a printer driver is installed in a location predefined by the operating system. At step S2302, the version management module 2022 is called and caused to obtain the version of each printer driver and information on printer models supported and generate the printer driver management table B, and the table B is obtained.

Figure 24:
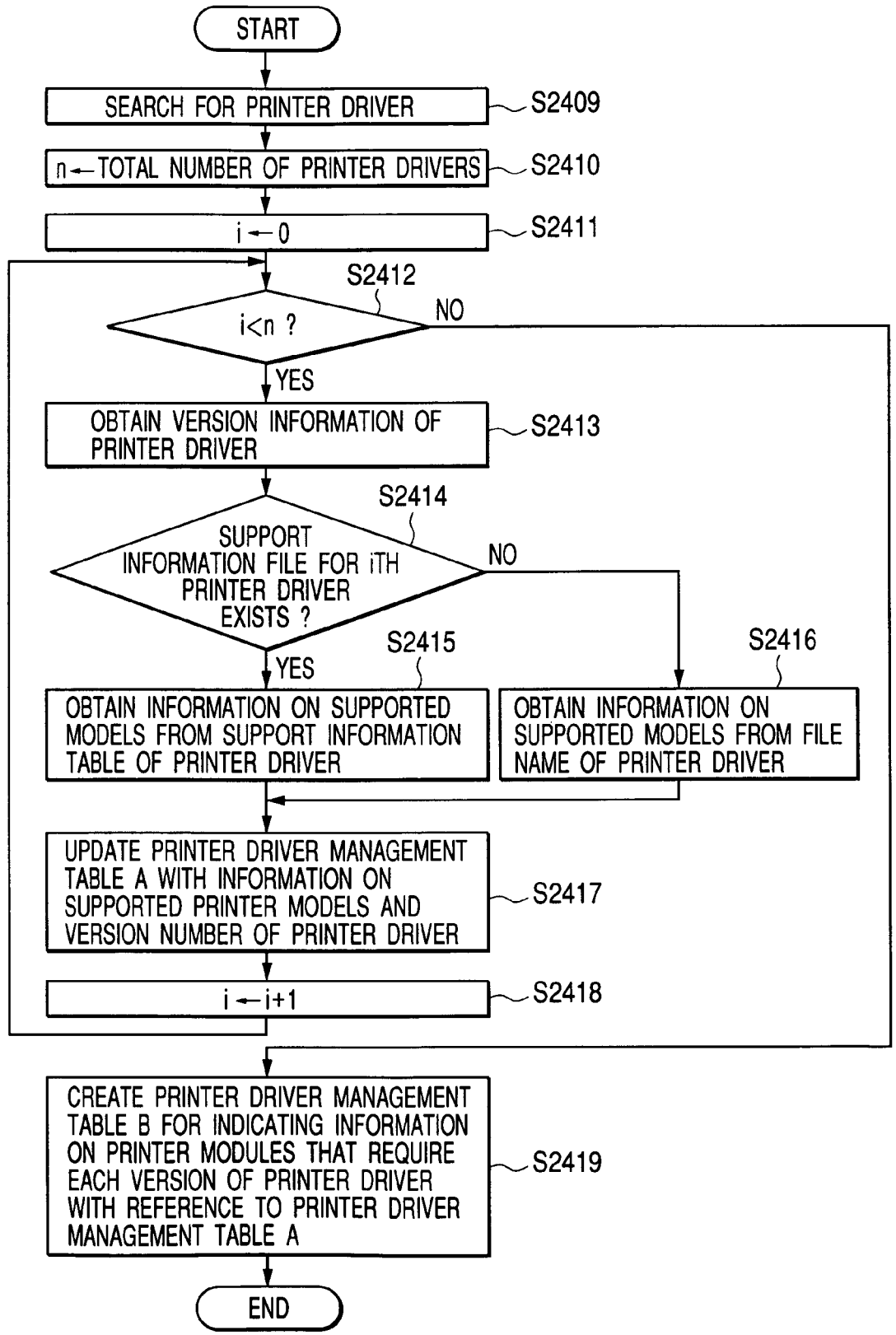
FIG. 24 is a flowchart showing processing by the version management module.

FIG. 24 is a flowchart illustrating details of step S2302, which is processing by the version management module 2022. At step S2409, it searches for printer drivers residing in an external storage device of the host computer. This search can be done, for example, by installing printer drivers in a predetermined directory within an area defined for the operating system and searching for executable files in the directory by the version management module 2022. At step S2410, the total number of printer drivers found in the search is stored in a variable n. At step S2411, a counter variable i is initialized to zero. At step S12, the counter variable i is compared with the total number of print controlling modules n. If i<n, the procedure proceeds to step S13. At step S2413, the version information of the printer driver is obtained. For example, in an OS like MacOSX (a trademark), a printer driver is configured with a hierarchical directory structure called bundle. A file having a predetermined file name exists in a predetermined location under the directory, with the version number described in it. Alternatively, in an operating system like MacOS9 (a trademark), version information is described in a file area referred to as resource. At step S2413, the installer, which is provided as an application for example, obtains version information by referring to information managed by such OS.

At step S2414, the installer searches for the support information table of the ith printer driver. For example, the support information file for a printer driver such as a driver for MacOSX (a trademark of Apple Computer, Inc.) that is managed with a directory structure is stored in a predetermined location under the directory hierarchy for printer drivers. For a printer driver for a different operating system, its support information may be reserved in a file area referred to as resource. At step S2414, such a support information table is searched for. If a support information table is found, the procedure proceeds to step S2415. At step 2415, printer models which the printer driver can control descried in the support information table is obtained. If a support information table is not found at S2414, the procedure proceeds to S2416. At S2416, information on printer models supported by the printer driver is obtained by another means. For example, if the file name of the printer driver includes the name of a printer model, the version management module can obtain the name of a model supported by the printer driver from the file name. Alternatively, even if the file name does not include a printer model name, the version management module has a table which associates file names of printer drivers with printer models, and printer models that can be supported by the printer driver may be obtained by referring to the table.

At step S2417, the module management table A is updated with information on printer models supported by the ith printer driver and its version number.

FIGS. 26 and 27 show the structure of the module management table A. The module management table A includes information on printer models, version numbers of printer drivers, and information identifying printer drivers. Information identifying printer driver is reference information on printer drivers managed by the operating system.

Figure 25:
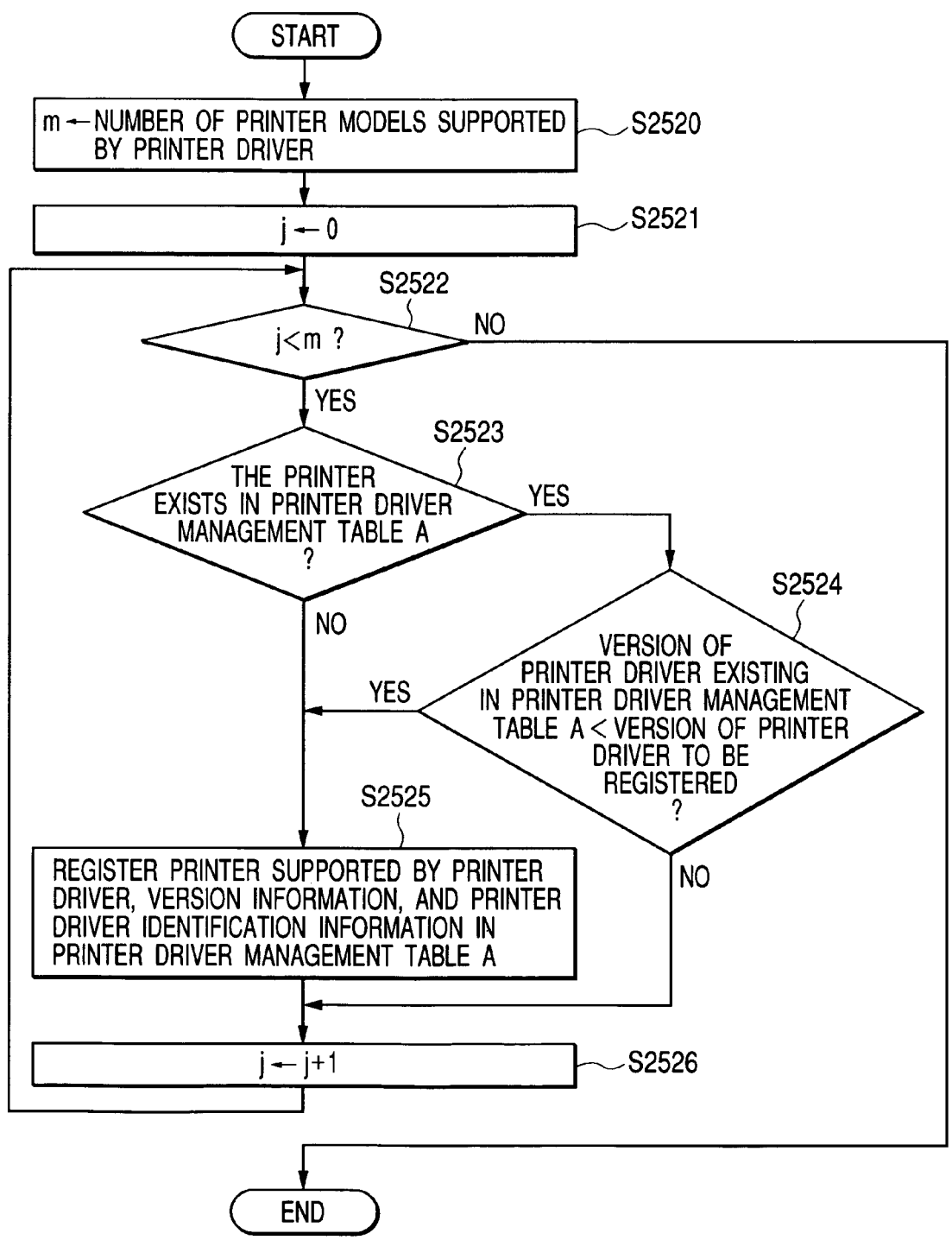
FIG. 25 is a flowchart showing the details of updating of the printer driver management table A in FIG. 24.

FIG. 25 is a flowchart showing details of step S2417. At step S2520, the number of printer models supported by the printer driver being processed is assigned to a variable m. At step S2521, a counter variable j is initialized to zero. At step S2522, the variable m is compared to variable j. If j<m, the procedure proceeds to step S2523 and processing at step S2523 and subsequent steps is performed for the jth printer among those supported by the printer driver. At step S2523, it is checked if the jth printer is already registered in the printer driver management table A. If the jth printer does not exist in the printer driver management table A at step S2523, the procedure proceeds to step S2525 to register information on the printer in the module management table A. If the jth printer exists in the printer driver management table, the procedure proceeds to step S2524. At step S2524, for the jth printer in question, the version of the printer driver already registered in the printer driver management table A is compared to that of the printer driver now being processed. If the version of the printer driver being processed is larger, the procedure proceeds to step S2525. At step S2525, information on the corresponding printer in the printer driver management table A is updated with the identification information and version information of the printer driver being processed. If the version of the printer driver being processed is less than that of the printer driver already registered in the printer driver management table A, the printer driver management table A is not updated at S2525. At step S2526, the counter variable j is incremented and the procedure returns to step S2522 to perform the same processing for the next printer supported by the printer driver being processed. When j<m no longer holds and thus all printers have been processed at step S2522, the process in the flowchart in FIG. 25 is terminated and the procedure returns to step S2418 in the flowchart in FIG. 24.

At step S2418 in the flowchart in FIG. 24, the procedure increments the counter variable i and returns to step S2412 to perform the same processing for the next printer driver. If i<n no longer holds and all printer drivers have been processed at step S2412, the procedure proceeds to step S2419. At step S2419, the printer driver management table B is generated from the printer driver management table A.

FIGS. 28 and 29 show the structure of the printer driver management table B. The printer driver management table B has printer driver identification information, version numbers of printer drivers, the number of printer models and printer information, being generated by sorting the printer driver management table A with the printer drivers as the key. Reference to this table gives printer models that require each version of printer driver.

FIGS. 26 and 28 show printer driver management tables A and B which are generated through the process in the flowcharts in FIGS. 24 and 25 by the version management module 2022 in the printer driver configuration in FIG. 20. The printer driver management table A in FIG. 26 shows that the largest version of printer driver for supporting printer A is the printer driver 3, the largest version of printer driver for supporting printer B is printer driver 3, the largest version of printer driver for supporting printer C is the printer driver 3, and the largest version of printer driver for supporting the printer D is the printer driver 2. Further, the printer driver management table B in FIG. 28, which is generated based on the table A, shows that no printer requires the printer driver 1; the printer driver 2 is required for the printer D; and the printer driver 3 is required for printers A, B and C.

After the version management module generates the printer driver management table B, the procedure returns to step S2303 in FIG. 23, which shows processing by the installation main module 2121. At step S2303, the total number of printer drivers registered in the printer driver management module B is assigned to a variable n. At step S2304, the counter variable i is initialized to zero. At step S2305, the variable n is compared with variable i. If i<n, the procedure proceeds to step S2306. At step S2306, the number of printer models that require the ith printer driver in the printer driver management table B is obtained and it is checked if the number is zero. If the number is zero, the procedure proceeds to step S2307 to delete the printer driver. If the number of printer models requiring the ith printer driver is not zero at step S2306, the printer driver is not deleted.

At step S2308, the counter variable i is incremented and the procedure returns to step S2305. If all the printer drivers registered in the printer driver management table B have been processed and i<n no longer holds at step S2305, the processing by the installation main module 21 is terminated.

For the printer driver configuration in FIG. 20, the printer driver management module B will be as shown in FIG. 28, thus the printer driver 1 which is required by zero printer models is deleted after executing the installation main module 2130.

Figure 21:
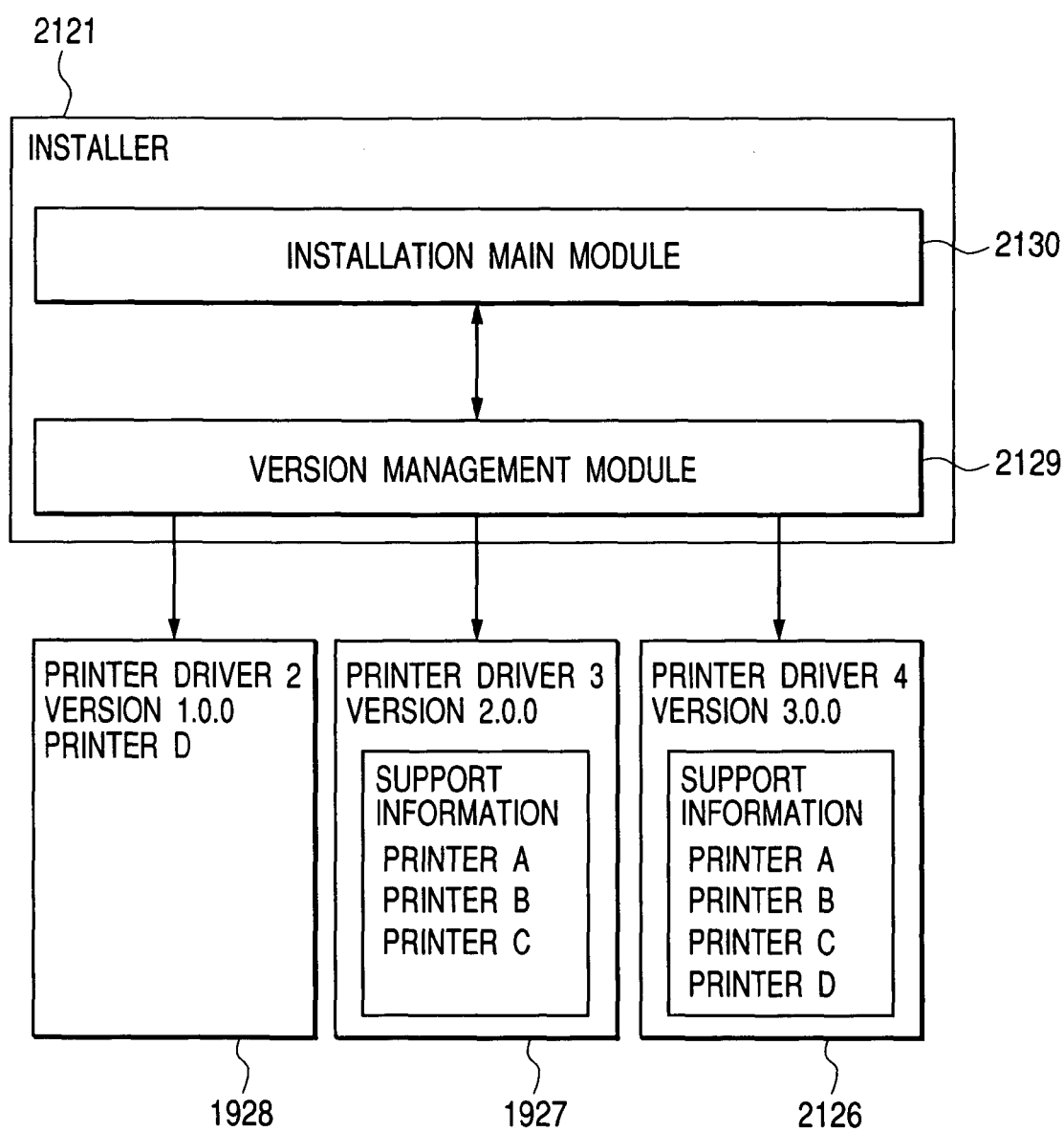
FIG. 21 is a block diagram showing another example of the environment in which an installer is executed.

FIG. 21 shows a block diagram of another execution environment at the point the installer of the embodiment is executed. FIG. 21 shows a state in which an additional printer driver 4 is installed in the environment in FIG. 20 with the printer driver 3 installed and the printer driver 1 deleted. The printer driver 4 has a support information table and can control four models of printers A, B, C and D, as shown in the row for the printer driver 4 in FIG. 22. The version of the control program of the printer driver 4 is 3.0.0.0.

The module management table A that is generated by executing the version management module detailed in the flowcharts in FIGS. 24 and 25 is shown in FIG. 27. The table shows that a printer driver of the largest version that supports printers A, B, C and D is the printer driver 4 respectively. The printer driver management table B that is generated based on the printer driver management table A in FIG. 27 is shown in FIG. 29. The table shows that there is no printer that requires the printer drivers 2 and 3 and printers that require the printer driver 4 are the printers A, B, C and D. That is, when the installer main module based on the flowchart in FIG. 23 is executed, the printer driver 4 is installed and then the printer drivers 2 and 3 are deleted.

Another Embodiment

Processing shown in the figures of the embodiment is carried out by individual information processing apparatuses based on programs installed externally. The invention is applicable to a case where pieces of information including programs are provided to the host computer from storage media such as CD-ROM, flash memory and FD, or from an external storage medium via a network.

The object of the invention can also be attained by providing a storage medium recording a program code of software realizing the features of the above embodiment to the system or device or downloading them from an external server (not shown), and reading and executing the program code stored in the storage medium by the computer (or CPU or MPU) of the system or the device.

In such a case, the program code itself read from the storage medium will realize the novel features of the invention, and the storage medium storing the program code will constitute the invention. For the storage medium for providing the program code, floppy disk, hard disk, optical disk, magneto-optical disk, DVD, CD-ROM, magnetic tape, non-volatile memory card, ROM and EEPROM can be used, for example.

Also, not only the features of the embodiments above are realized by the computer executing the program code that has been read out, but a case is also encompassed where an OS (operating system) and the like operating on the computer performs a portion or all of actual processing based on the directions of the program code so that the processing realizes the features of the embodiments mentioned above. In addition, a case is also encompassed where the program code read from the storage medium is written to a function extension board inserted to the computer or to a memory provided in a function extension unit connected to the computer, and then CPU and the like provided in the function extension board or function extension unit performs a portion or all of the actual processing based on the directions of the program code so that the features of the embodiments above are realized through the processing.

As described above, according to each embodiment of the invention, an installer for printer drivers can be provided that can install a printer driver and then recognize and delete a printer driver of an older version that is no longer required, in an environment for a host computer in which printer drivers are installed that have different file names due to difference in printer driver version and printers they can control. As a result, operation of deleting unnecessary older versions of printer drivers, which is conventionally performed manually by users, can be done by the installer, thus simplifying uninstallation of printer drivers by users.

Since printer drivers no longer necessary are automatically recognized and the recognized drivers are deleted, uninstallation of printer drivers can be simplified.

What is claimed is:

1. An information processing apparatus comprising:
   a computer processor;
   a memory unit coupled to said computer processor, said memory unit configured to store a plurality of print control modules, including first and second print control modules, for performing processing corresponding to printer functions, each of the first and second print control modules supporting a plurality of types of printers, and store a management table that contains identification information of the first print control module, version information of the first print control module, and printer type information regarding printers supported by the first print control module;
   an obtaining unit configured to obtain, from the second print control module, version information of the second print control module and printer type information regarding the plurality of types of printers supported by the second print control module;
   an updating unit configured to update the management table stored in said memory unit by recording identification information of the second print control module, and the version information and the printer type information obtained by said obtaining unit in the management table, if at least one printer type of the printer type information for the second print control module obtained by said obtaining unit is identical to at least one printer type of the printer type information for the first print control module contained in the management table and if the version information of the second print control module obtained by said obtaining unit is newer than the version information of the first print control module contained in the management table, wherein said updating unit updates the management table without updating the second print control module;
   a recognition unit configured to recognize a printer type of a certain printer;
   a selection unit configured to select one of the first and second print control modules in correspondence with the printer type recognized by said recognition unit by referring to the management table updated by said updating unit; and
   an execution unit configured to execute the print control module selected by said selection unit.

2. The information processing apparatus according to claim 1, further comprising a setting unit configured to set the print control module for the version information selected by said selection unit such that the print control module can control the printer.

3. The information processing apparatus according to claim 2, further comprising a control unit configured to inhibit activation of a print control module for the version information that is not selected by said selection unit.

4. The information processing apparatus according to claim 2, further comprising:
   an identification unit configured to identify a first control program that controls the printer not based on a selection result by said selection unit and a second control program that controls the printer based on a result by said selection unit; and
   an activation control unit configured to perform control such that the first control program is activated when said identification unit recognizes that the first control program exists.

5. The information processing apparatus according to claim 2, wherein said setting unit recognizes that the print control module can control a printer among printers supported by the print control module when a database file exists that stores control conditions and control variables for the printer.

6. A control method for controlling an information processing apparatus having a memory unit configured to store a plurality of print control modules, including first and second print control modules, for performing image processing and control processing corresponding to printer functions, each of the first and second print control modules supporting a plurality of types of printers, and store a management table that contains identification information of the first print control module, version information of the first print control module, and printer type information regarding printers supported by the first print control module, said control method comprising:
   obtaining, from the second print control module, version information of the second print control module and printer type information regarding the plurality of types of printers supported by the second print control module;
   updating the management table by recording identification information of the second print control module, and the version information and the printer type information obtained from the second print control module in the management table, if at least one printer type of the printer type information for the second print control module obtained from the second print control module is identical to at least one printer type of the printer type information for the first print control module contained in the management table and if the version information of the second print control module obtained from the second print control module is newer than the version information of the first print control module contained in the management table, wherein said management table is updated without updating the second print control module;
   recognizing a printer type of a certain printer;
   selecting one of the first and second print control modules in correspondence with the recognized printer type by referring to the management table; and
   executing the selected print control module.

7. The control method according to claim 6, wherein correspondence information is recorded in a table format the correspondence information including the printer type information, the version information, and identification information for the print control module.

8. The control method according to claim 6, further comprising setting the print control module for the selected version information such that the print control module can control the printer.

9. The control method according to claim 8, further comprising inhibiting activation of a print control module for the version information that is not selected.

10. The control method according to claim 8, further comprising:
   identifying a first control program that controls the printer not based on a selection result of said selecting and a second control program that controls the printer based on a result of said selecting; and
   controlling such that the first control program is activated when a recognition is made that the first control program exists.

11. The control method according to claim 8, wherein a recognition that the print control module can control a printer among printers supported by the print control module is recognized, when a database file that stores control conditions and control variables for the printer exists.

12. A non-transitory computer-readable storage medium storing thereon an executable program that can be executed in an information processing apparatus having a memory unit configured to store a plurality of print control modules, including first and second print control modules, for performing image processing and control processing corresponding to printer functions, each of the first and second print control modules supporting a plurality of types of printers, and store a management table that contains identification information of the first print control module, version information of the first print control module, and printer type information regarding printers supported by the first print control module, said storage medium storing an executable program for causing said information processing apparatus to perform a method comprising:
   obtaining, from the second print control module, version information of the second print control module and printer type information regarding the plurality of types of printers supported by the second print control module;
   updating the management table by recording identification information of the second print control module, and the version information and the printer type information obtained from the second print control module in the management table, if at least one printer type of the printer type information for the second print control module obtained from the second print control module is identical to at least one printer type of the printer type information for the first print control module contained in the management table and if the version information of the second print control module obtained from the second print control module is newer than the version information of the first print control module contained in the management table, wherein said management table is updated without updating the second print control module;
   recognizing a printer type of a certain printer; selecting one of the first and second print control modules inn correspondence with the recognized printer type by referring to the management table and
   executing the selected print control module.

* * * * *